(12) United States Patent
Schroepf et al.

(10) Patent No.: US 10,954,065 B2
(45) Date of Patent: Mar. 23, 2021

(54) METHOD AND SYSTEM FOR DELIVERING ITEMS IN DELIVERY CONTAINERS

(71) Applicant: TGW Logistics Group GmbH, Marchtrenk (AT)

(72) Inventors: Harald Johannes Schroepf, Wels (AT); Markus Winkler, Altmuenster (AT)

(73) Assignee: TGW Logistics Group GmbH, Marchtrenk (AT)

( * ) Notice: Subject to any disclaimer, the term of this patent is extended or adjusted under 35 U.S.C. 154(b) by 48 days.

(21) Appl. No.: 15/747,857

(22) PCT Filed: Jun. 21, 2016

(86) PCT No.: PCT/AT2016/050217
§ 371 (c)(1),
(2) Date: Jun. 14, 2018

(87) PCT Pub. No.: WO2017/015681
PCT Pub. Date: Feb. 2, 2017

(65) Prior Publication Data
US 2018/0290829 A1    Oct. 11, 2018

(30) Foreign Application Priority Data

Jul. 27, 2015 (AT) .............................. A50671/2015

(51) Int. Cl.
*B65G 1/137* (2006.01)
*B65G 1/10* (2006.01)
(Continued)

(52) U.S. Cl.
CPC .............. *B65G 1/10* (2013.01); *B25J 9/1679* (2013.01); *B65G 1/0407* (2013.01);
(Continued)

(58) Field of Classification Search
CPC ................................... B65G 1/10; B65G 1/20
See application file for complete search history.

(56) References Cited

U.S. PATENT DOCUMENTS 5,934,413 A * 8/1999 Konig ...................... B65G 1/04
186/56
7,047,710 B2    5/2006 Winkler
(Continued)

FOREIGN PATENT DOCUMENTS

DE         32 204 15 A1    12/1983
EP         1 462 394 A1     9/2004
(Continued)

OTHER PUBLICATIONS

International Search Report of PCT/AT2016/050217, dated Oct. 10, 2016.

*Primary Examiner* — Thomas Randazzo
(74) *Attorney, Agent, or Firm* — Collard & Roe, P.C.

(57) ABSTRACT

The invention relates to a method and a system intended for delivering items (4) in delivery containers (3) and in which, in a supply depot (1), the items are order picked, in accordance with orders placed, into delivery containers and then the delivery containers are loaded onto a transport rack (12). The transport rack is loaded with the delivery containers in a loading sequence determined by the computer system (2). Thereafter, the transport racks are transported, by means of a transport system, from the supply depot to a buffer depot (collection depot). A consignee (68) can collect the ordered item from the buffer depot at an issuing station (56). The transport rack is positioned, in the buffer depot, against a docking apparatus (54) such that a storage and retrieval unit (17) can access compartments in the transport rack. The delivery containers are removed from the transport rack and moved either to storage compartments (55) in the buffer depot (53), if they have not been requested at the issuing (Continued)

Figure 1:
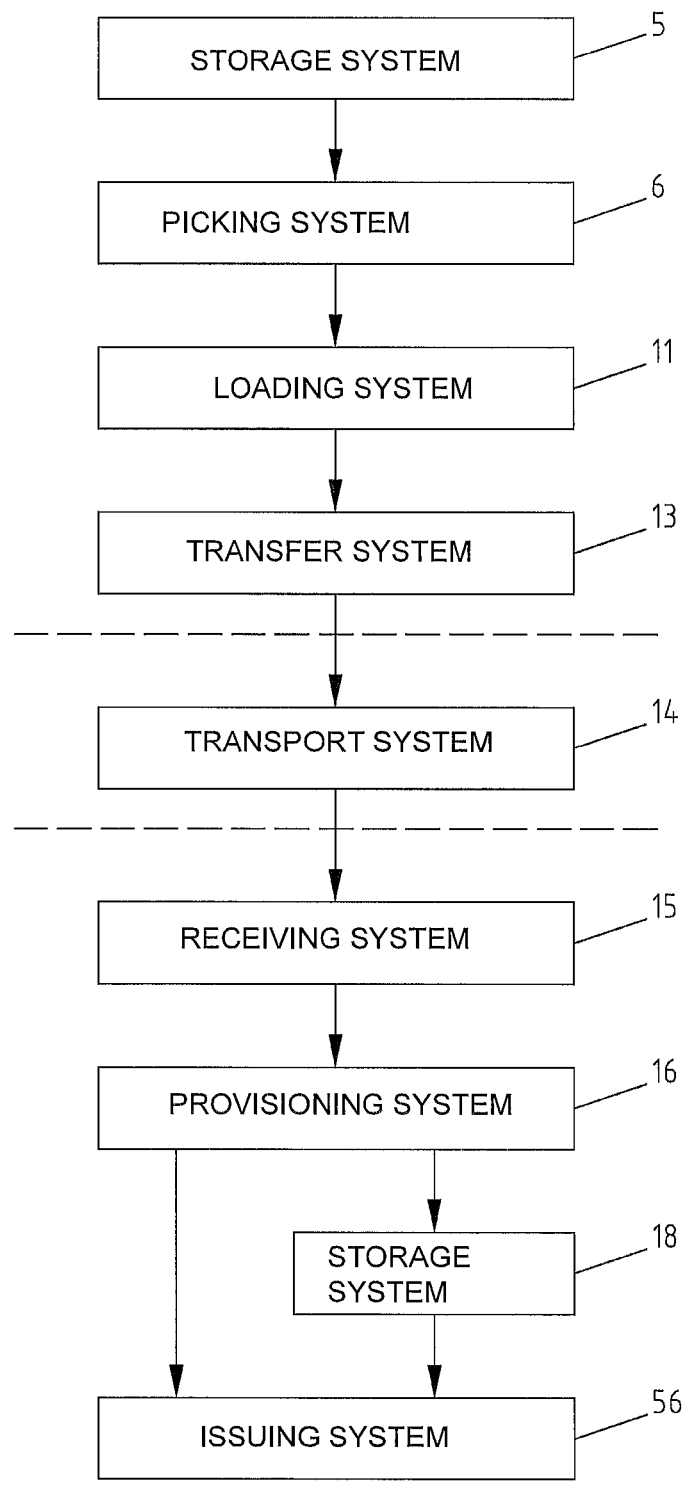

station, or to a service location (58), if they have been requested at the issuing station (56).

31 Claims, 12 Drawing Sheets

(51) Int. Cl.
    *B25J 9/16* (2006.01)
    *G06Q 50/28* (2012.01)
    *G06Q 10/08* (2012.01)
    *B65G 1/04* (2006.01)
    *B60P 1/00* (2006.01)
    *G06K 7/10* (2006.01)

(52) U.S. Cl.
    CPC ......... *B65G 1/1378* (2013.01); *G06Q 10/083* (2013.01); *G06Q 50/28* (2013.01); *B60P 1/00* (2013.01); *G06K 2007/10504* (2013.01)

(56) References Cited

U.S. PATENT DOCUMENTS

| | | | |
|---|---|---|---|
| 9,421,580 B2 | 8/2016 | Hansl et al. | |
| 10,089,593 B1* | 10/2018 | Griffith | G06Q 10/083 |
| 2006/0213402 A1* | 9/2006 | Grimal | B65D 19/44 |
| | | | 108/51.11 |
| 2007/0144991 A1 | 6/2007 | Hansl et al. | |
| 2008/0046115 A1* | 2/2008 | Tabellion | B65G 1/137 |
| | | | 700/226 |
| 2008/0308356 A1* | 12/2008 | Spiro | G06Q 30/06 |
| | | | 186/57 |
| 2014/0045515 A1* | 2/2014 | Austin | H04W 4/021 |
| | | | 455/456.1 |
| 2015/0178816 A1 | 6/2015 | Zak | |
| 2015/0336741 A1 | 11/2015 | Ahammer et al. | |
| 2016/0075511 A1* | 3/2016 | Poulin | B65G 1/0435 |
| | | | 414/331.08 |
| 2016/0221768 A1* | 8/2016 | Kadaba | G08G 1/205 |
| 2016/0232477 A1* | 8/2016 | Cortes | G06Q 10/087 |
| 2016/0342931 A1* | 11/2016 | Muench | G06Q 10/083 |
| 2017/0107056 A1* | 4/2017 | Kadaba | B65G 1/137 |
| 2018/0290829 A1* | 10/2018 | Schroepf | G06Q 50/28 |

FOREIGN PATENT DOCUMENTS

| | | |
|---|---|---|
| EP | 1 801 040 A1 | 6/2007 |
| EP | 1 814 809 B1 | 6/2009 |
| EP | 1 697 251 B1 | 9/2009 |
| EP | 2 119 643 A1 | 11/2009 |
| EP | 2 607 271 A1 | 6/2013 |
| FR | 3 007 957 A1 | 1/2015 |
| GB | 998 434 A | 7/1965 |
| WO | 97/00218 A1 | 1/1997 |
| WO | 00/54229 A1 | 9/2000 |
| WO | 03/019425 A1 | 3/2003 |
| WO | 2006/045569 A1 | 5/2006 |
| WO | 2013/090969 A1 | 6/2013 |
| WO | 2013/090970 A2 | 6/2013 |
| WO | 2013/147597 A1 | 10/2013 |
| WO | 2014/009257 A2 | 1/2014 |

* cited by examiner

Fig.2b
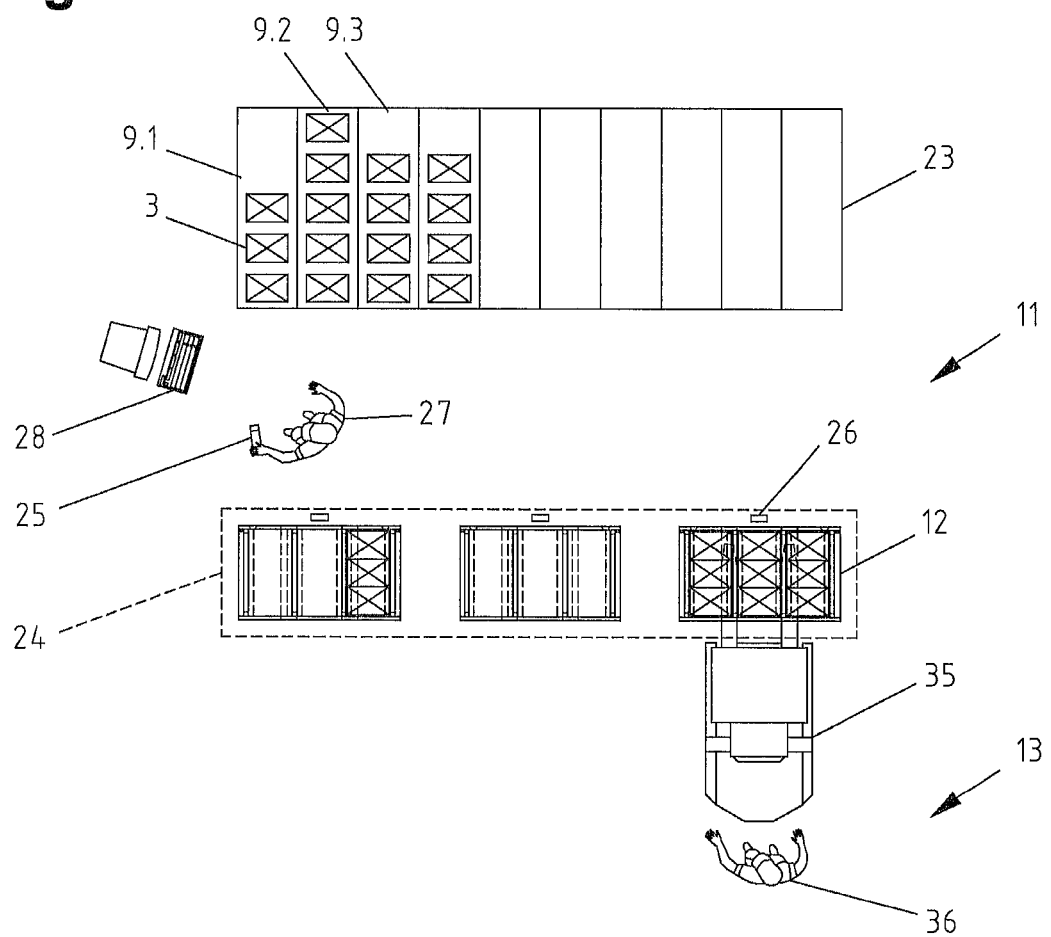
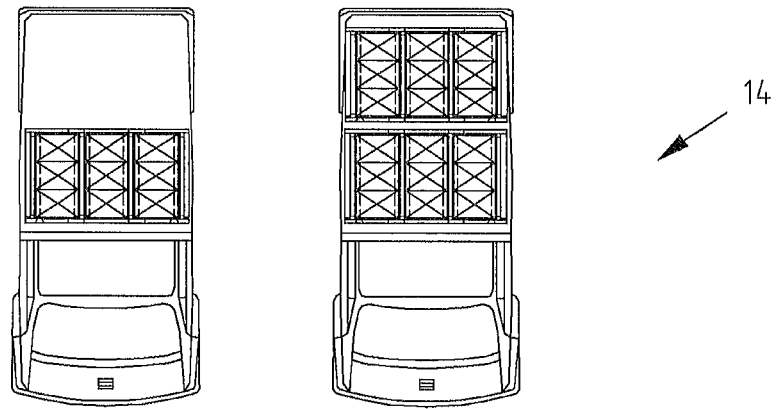

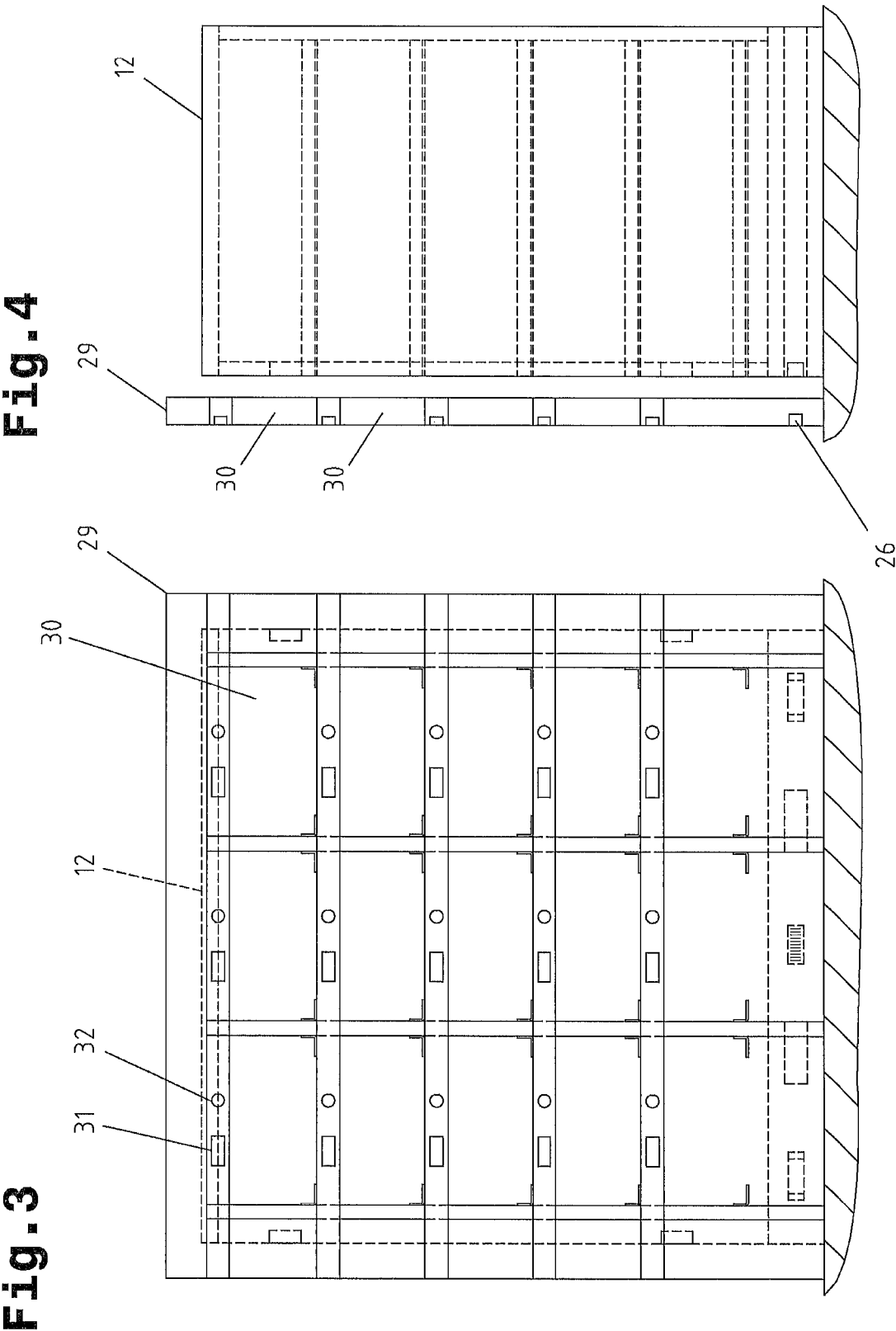

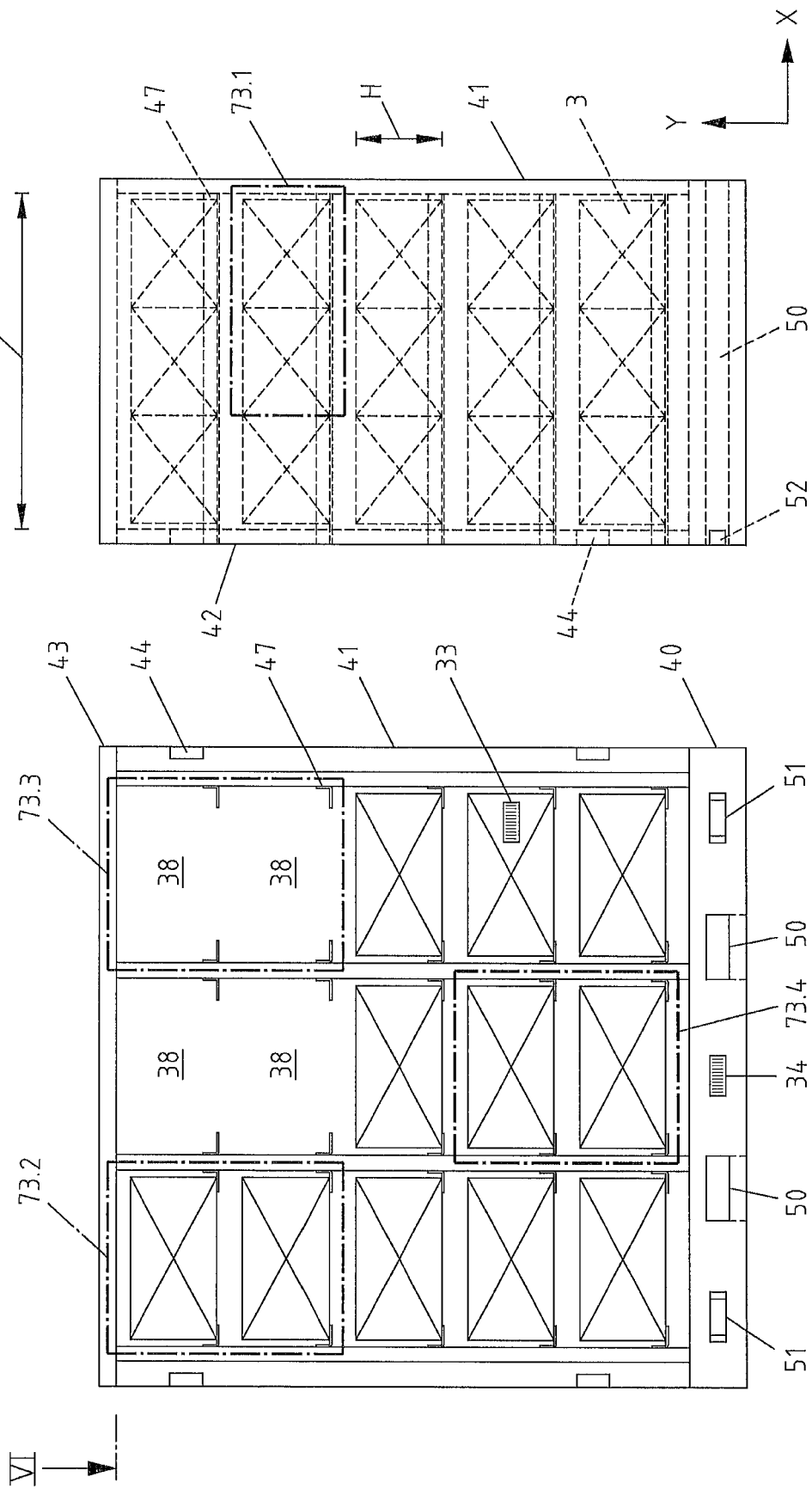

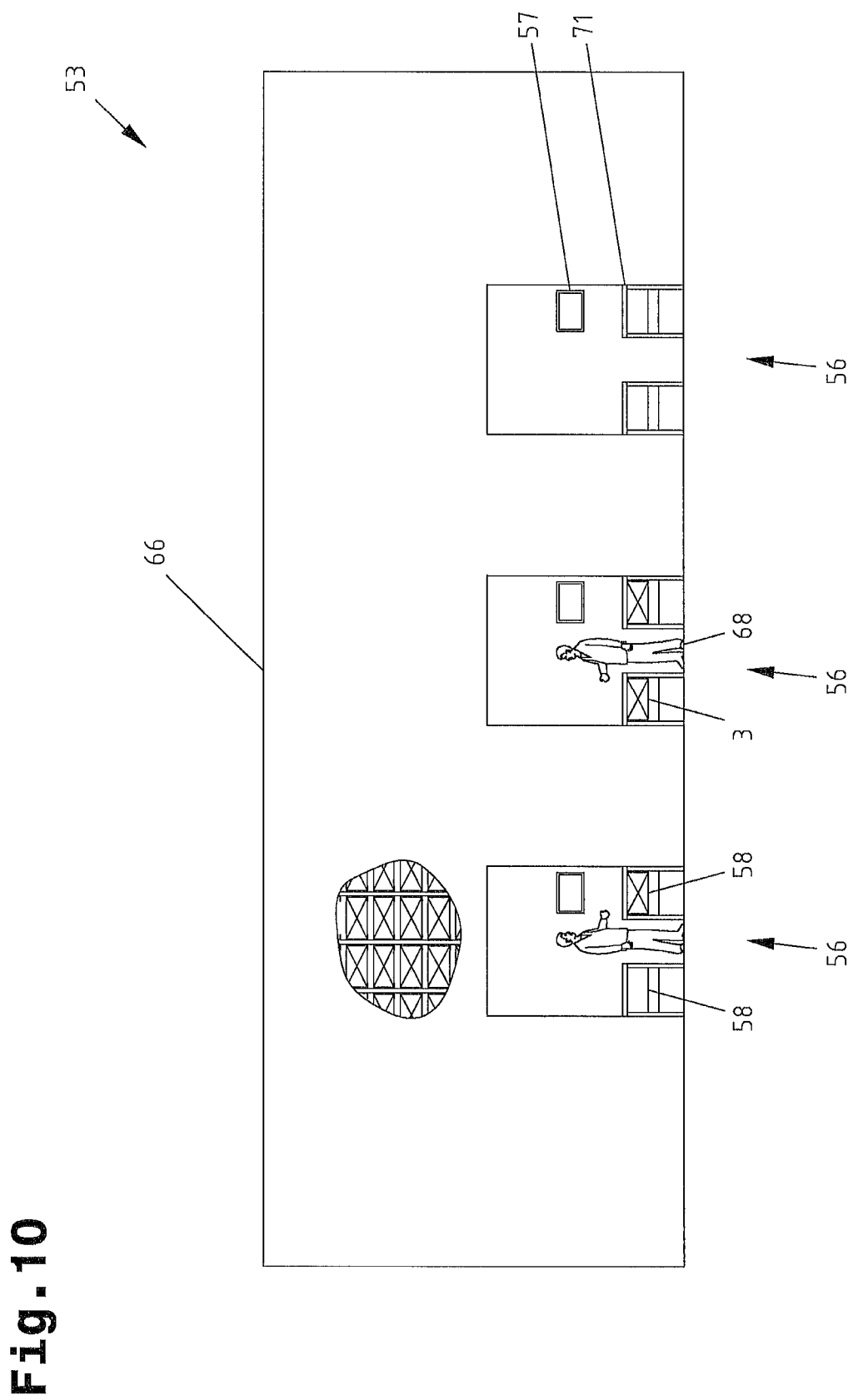

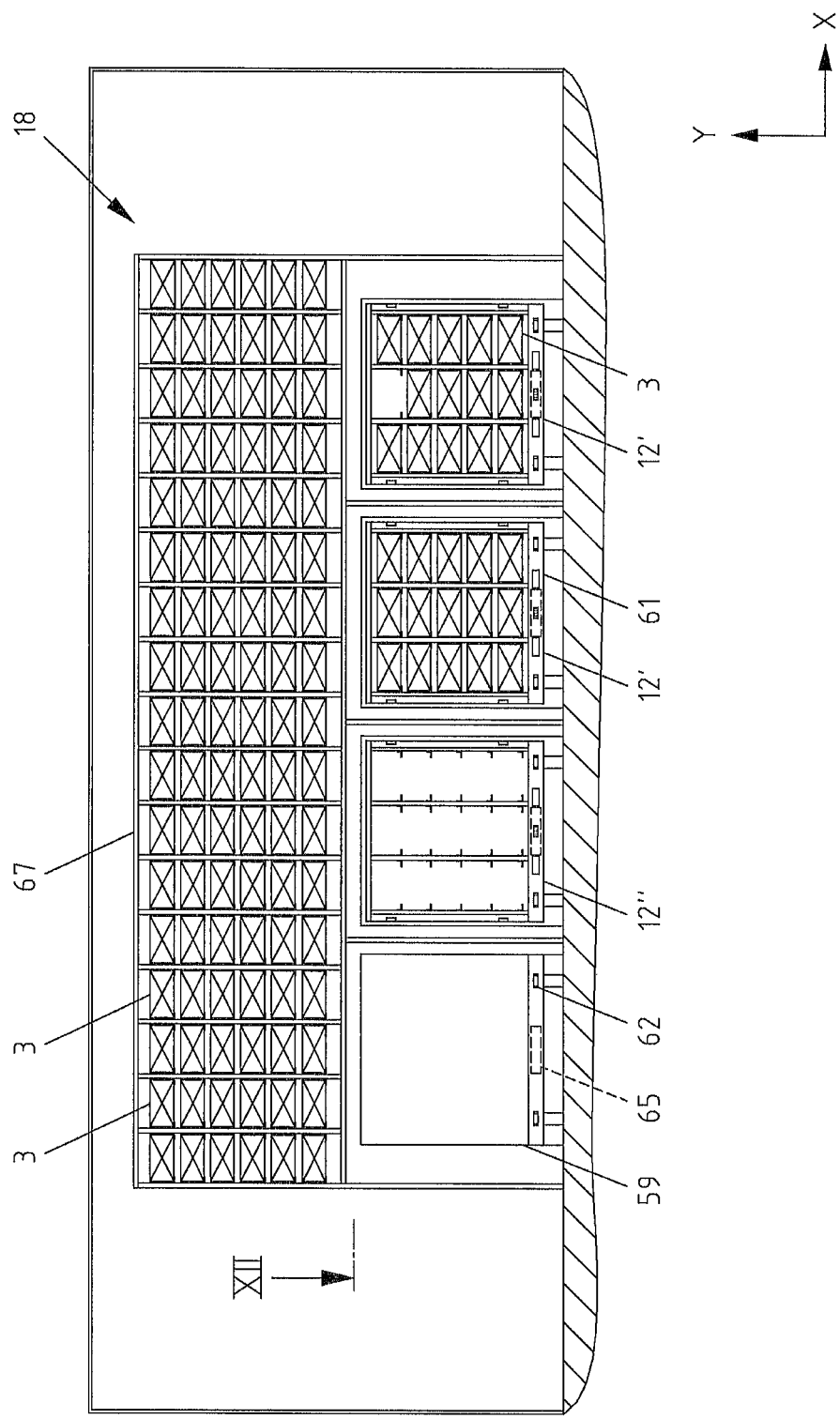

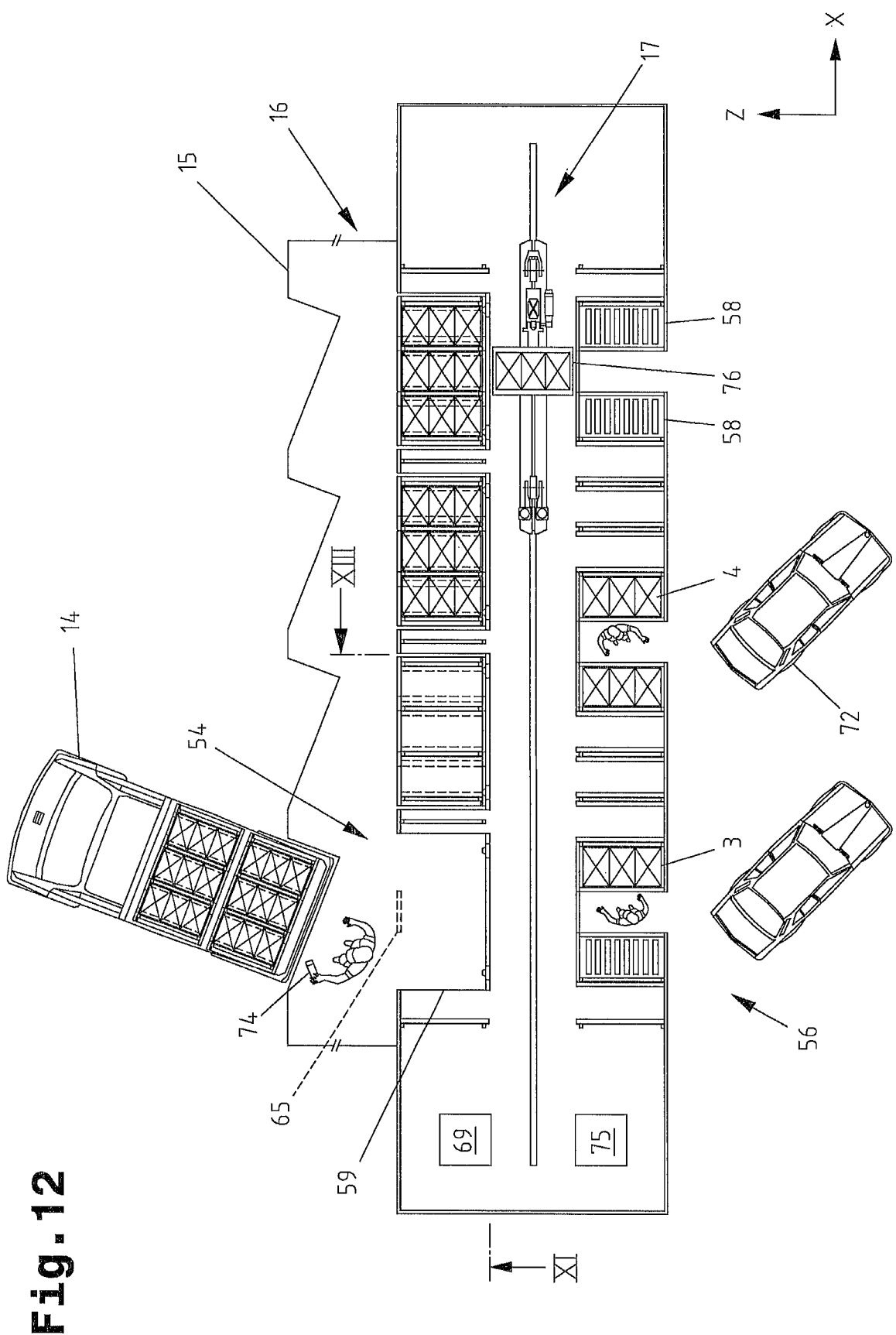

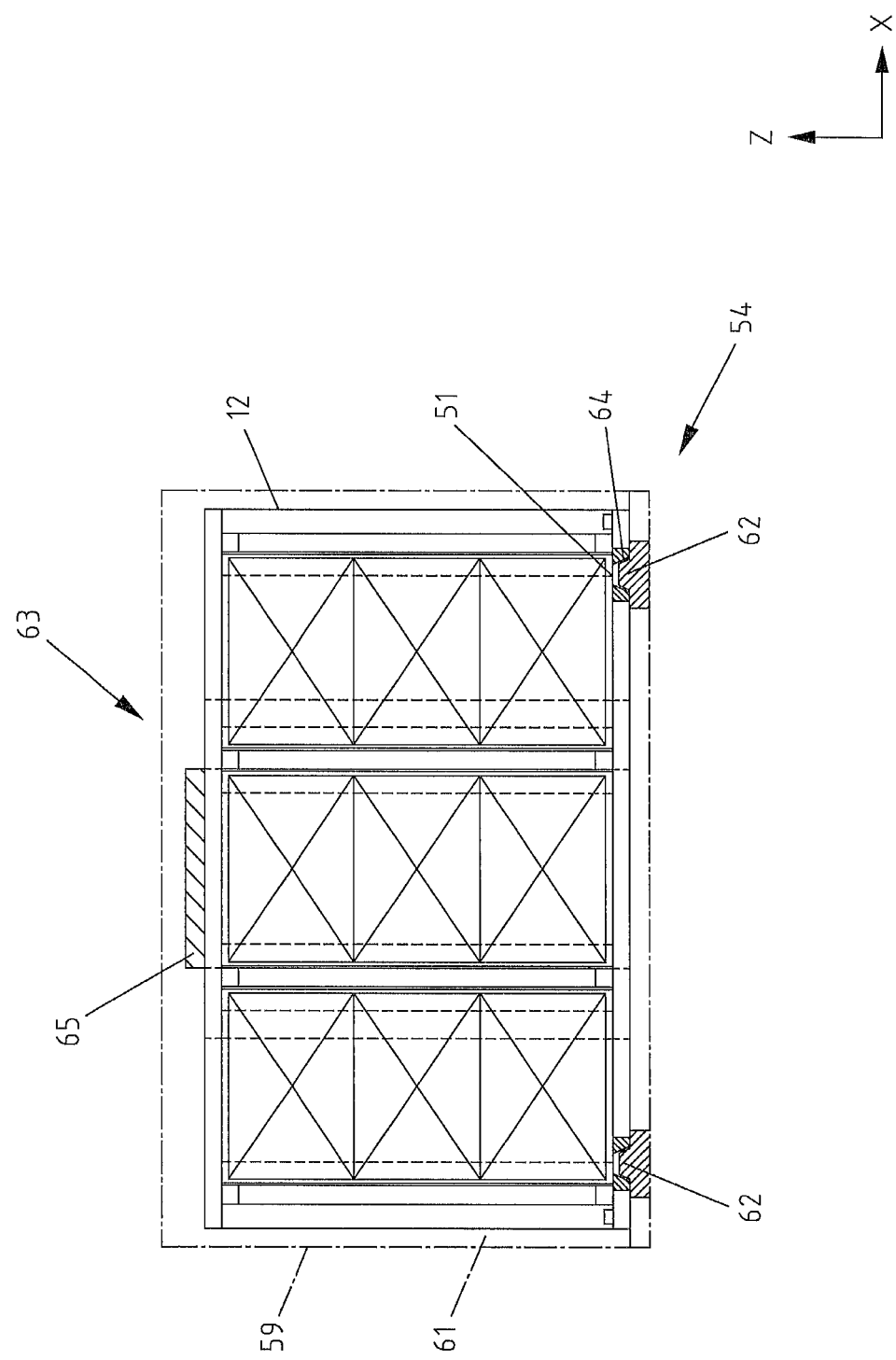

METHOD AND SYSTEM FOR DELIVERING ITEMS IN DELIVERY CONTAINERS

CROSS REFERENCE TO RELATED APPLICATIONS

This application is the National Stage of PCT/AT2016/050217 filed on Jun. 21, 2016, which claims priority under 35 U.S.C. § 119 of Austrian Application No. A50671/2015 filed on Jul. 27, 2015, the disclosure of which is incorporated by reference. The international application under PCT article 21(2) was not published in English.

The invention relates to a method and a system for delivering items in delivery containers, as described in the introductory parts of claims 1 and 11.

In conventional goods dispatch systems, online items are ordered by a consignee (customer) via the Internet on an order platform of a vendor (supplier). The items are food items and other goods needed for daily life. On the vendor's side, the items for an order are picked in one or more delivery containers and the delivery container(s) is/are then delivered to a delivery address of the consignee or to a buffer depot for storing the delivery containers. If the delivery container is delivered to a buffer depot, the consignee can collect the ordered item from the buffer depot at any time. Such buffer depots have storage racks, an automated storage and retrieval device, an issuing station with a service point and an input device. The vendor supplies the buffer depot with delivery containers. At the buffer depot, the delivery containers are transferred to a waiting system, from which the storage and retrieval device collects the delivery container and then places it in the storage racks for storage. From the input device, the consignee can enter an access code, received beforehand in the form of an electronic message for example, so that the ordered items will be made available at the issuing station. The delivery container is temporarily stored in a storage compartment in the buffer depot and is retrieved and conveyed to the issuing station by an automated storage and retrieval device and handed over to the service point.

Such goods dispatch systems are known from WO 00/54229 A1 and WO 03/019425 A1, for example.

According to WO 00/54229 A1, a plurality of delivery containers are assembled in mobile containers and these containers placed in readiness in the buffer depot. The containers and the buffer depot are respectively provided with a separate transport system. Both transport systems are needed in order to retrieve the delivery containers from the container. This increases the complexity of the goods dispatch system and also makes handling of the container more difficult.

WO 97/00218 A1 discloses a supply depot, comprising a storage system for preparing goods placed individually on goods carriers (trays), a picking system for assembling the goods on the goods carriers in accordance with picking orders and a loading station for provisioning transport racks and transferring the delivery containers onto these transport racks. The transport racks form shelf compartments in horizontal shelf rows disposed one above the other and vertical shelf columns disposed adjacent to one another in which the goods carriers for one or more picking orders can be placed.

The objective of this invention is to propose a method and a system for delivering items in delivery containers which enable efficient operation of a buffer depot.

The objective of the invention is achieved by the following steps:
- determining a loading sequence for delivery containers for picking orders by a computer system, and
- loading the at least one transport rack with the delivery containers in the supply depot in the loading sequence determined by the computer system in the compartments in horizontal shelf rows disposed one above the other and/or adjacently disposed vertical shelf columns, and
- providing the at least one transport rack at the docking device in the buffer depot such that the compartments in the horizontal shelf rows disposed one above the other and adjacently disposed vertical shelf columns lie within the access range of the storage and retrieval device and the storage and retrieval device is able to access the delivery containers in these compartments, and
- while the transport rack is provided at the docking device, transferring the delivery containers by means of the storage and retrieval device from the compartments either to the storage compartments in the buffer depot if not they have not yet been requested by a consignee at the issuing station or to the service location if they have been requested by a consignee at the issuing station.

The transport racks are loaded in a supply depot separate from a buffer depot (collection depot) in a defined loading sequence. The loading sequence takes account in particular of the sorting of delivery containers according to customer orders and/or picking orders. A customer order, which usually comprises several delivery containers, is assembled in a compartment or in several compartments. Sorting of the delivery containers in the buffer depot is not necessary. Instead, the storage and retrieval device merely has to access the delivery containers of the customer orders. The buffer depot can therefore be operated with very high storage efficiency, even if only one storage and retrieval device is used. Furthermore, depending on requirements, the storage and retrieval device can be used either for storage mode in order to transfer all the delivery containers from the transport rack into storage compartments or for direct retrieval mode in order to transfer delivery containers that are still on the transport rack during provision and that the consignee would like to collect at the issuing station from the transport rack to the issuing station. The advantage of being able to switch between storage mode and retrieval mode is that prompted by an input at the issuing station, the delivery containers can be transferred to the issuing station in the shortest time and the consignee receives his/her item rapidly. The switch from storage mode to direct retrieval mode is prompted by the request command. This reduces waiting time for the consignee at the issuing station when collecting his/her item. Afterwards, the storage and retrieval device can then resume storage mode immediately so that the storage efficiency is barely affected. Accordingly, the transport racks can also be emptied very rapidly so that the times within which the delivery containers can be made available are reduced.

It is of advantage if, in a compartment, the transport rack has a single storage space in which the delivery container is deposited or a plurality of storage spaces disposed one behind the other in which a plurality of delivery containers are deposited. The transport rack can be adapted depending on order volumes and turnover rates. In principle, a transport rack with fewer storage spaces can be used for orders that are on average not as large.

Based on a preferred embodiment, the transport rack has a maximum of five compartments one above the other and a maximum of three compartments adjacent to one another and the compartments each have a maximum of three storage spaces so that a transport rack can be loaded with a maximum of 45 delivery containers, the delivery containers having a length of at most 700 mm, a width of at most 600 mm and a height of at most 400 mm. The transport rack preferably has a maximum width of 2100 mm, a maximum depth of 1500 mm and a maximum height of 2000 mm. The transport rack is of a size which permits manual loading with (customer-specific) filled delivery containers and manual unloading of the delivery containers, if they are being returned from the buffer depot to the supply depot, as well as manual transport, for example with hand pallet trucks. The returned delivery containers may be empty or may contain a return item.

The delivery containers may preferably be positioned in the compartment against at least one position retaining means if the delivery containers might slide in the compartments during transportation of the transport rack or are held in position by at least one position retaining means to prevent a sliding movement of the delivery containers in the compartments. The transport rack is preferably transported between the supply depot and buffer depot by means of a transport vehicle (lorry). The position retaining means is used to ensure that the delivery containers are transported safely so that sensitive items are also not damaged or broken.

It is also of advantage if after picking the items, the delivery containers are transported to a loading system where the transport racks are also held in readiness and loaded with the delivery containers, and before loading the transport racks, the delivery containers are identified by means of a first detection unit and the transport racks are identified by means of a second detection unit, and the delivery containers are allocated to the respective transport rack and to the respective compartments in the transport rack by the computer system. The first detection unit is able to read a data carrier on the delivery container and the second detection unit is able to read a data carrier on the transport rack. Although a first detection unit and second detection unit are described as separate units, it goes without saying that it would be possible to use just a single detection unit which is able to identify both the delivery containers and the transport racks by reading a data carrier respectively. Accordingly, the first detection unit corresponds to the second detection unit. As a result of this feature of the invention, delivery containers are clearly allocated to transport racks on the one hand and delivery containers in a transport rack are clearly allocated to the compartments on the other hand, thereby enabling incorrect deliveries to be avoided. This enables returns and the high logistical effort they entail to be reduced.

It is also of particular advantage if the computer system determines a loading zone for every picking order of a plurality of picking orders when determining the loading sequence, and the loading zone may comprise one compartment or several compartments so that a number of delivery containers are available in a loading zone. In the case of above average orders made up of more than one delivery container, the maximum number of delivery containers are stored within a loading zone depending on the number of storage spaces per compartment. This makes it easy to load the transport racks in the supply depot and easy to remove the delivery containers from the transport rack in the buffer depot. In addition, a very high turnaround rate is achieved.

Based on another feature of the invention, before providing the at least one transport rack at the docking device in the buffer depot, the transport rack is identified by means of a third detection unit and an identification code is transmitted to a computer system of the buffer depot, whereupon this transport rack is provided at a selected docking device. This makes it possible to detect at an early stage if transport racks have been sent to the buffer depot out of a plurality of buffer depots in error. This ensures that only transport racks specifically designated for a buffer depot are sent there.

It is of advantage if the buffer depot comprises a computer system and after loading the transport rack in the supply depot, data about the loading sequence is made available to the computer system. Based on a preferred embodiment, after loading the transport rack in the supply depot, data relating to the loading sequence is transmitted via a data transmission device (data line) to the computer system in the buffer depot. The buffer depot is notified of the data relating to the loading sequence via the data transmission device (Internet) so that after identifying the transport rack, preferably by reading an identification code, the data supplied to the computer system can be retrieved. Based on another embodiment, the data relating to the loading sequence may also be stored on a data carrier which is attached to the transport rack. The data is read before the transport rack is docked in the docking device in the housing section. The data is made available by the computer system to the control system in the buffer depot to enable the storage and retrieval device to be activated accordingly. This enables the storage mode and direct retrieval mode to be organized even more efficiently.

It is also of advantage if the storage and retrieval device removes a maximum number of delivery containers for a picking order from the loading zone of the at least one transport rack. This enables the storage mode and direct retrieval mode to be organized even more efficiently.

The objective of the invention is also achieved due to the fact that the supply depot comprises a computer system which determines a loading sequence for the picking orders in order to load the at least one transport rack with the delivery containers in the loading sequence determined by the computer system on the compartments in horizontal shelf rows disposed one above the other and/or adjacently disposed vertical shelf columns, and the buffer depot comprises the at least one docking device for the transport rack which positions the at least one transport rack such that the compartments formed by the horizontal shelf rows disposed one above the other and adjacently disposed vertical shelf columns lie within the access range of the storage and retrieval device and the storage and retrieval device is able to access the delivery containers in these compartments, and while the transport rack is provided at the docking device, the storage and retrieval device transfers them from the compartments either to the storage compartments in the buffer depot if they have not yet been requested at the issuing station or to at least one service location if they have been requested at the issuing station.

Based on one embodiment of the invention, it is also possible for the transport rack to comprise a base plate, wall parts extending up therefrom and a top plate, and one of the wall parts can be moved between an open position and a closed position, and in the open position the delivery containers of all the compartments are accessible and in the closed position the delivery containers of all the compartments are secured in place. This enables the delivery containers to be secured in place during transportation of the transport rack and the wall part is not removed until the storage and retrieval device needs access to the compartments, namely when the transport rack is positioned/locked on the docking device in the housing section.

Finally, it is also of advantage if the storage compartments are provided in at least one stationary storage rack in horizontal shelf rows disposed one above the other and in adjacently disposed vertical shelf columns, and at least one of the storage racks forms a housing section in which the docking device is provided so that when positioned on the docking device, the transport rack forms a storage section of the at least one storage rack by means of the compartments. The mobile transport rack can be integrated in the storage rack as a storage section as and when necessary so that the storage and retrieval device is able to access the compartments directly. This enables the direct retrieval mode described above to be operated.

To provide a clearer understanding, the invention will be described in more detail below with reference to the appended drawings.

Figure 2A:
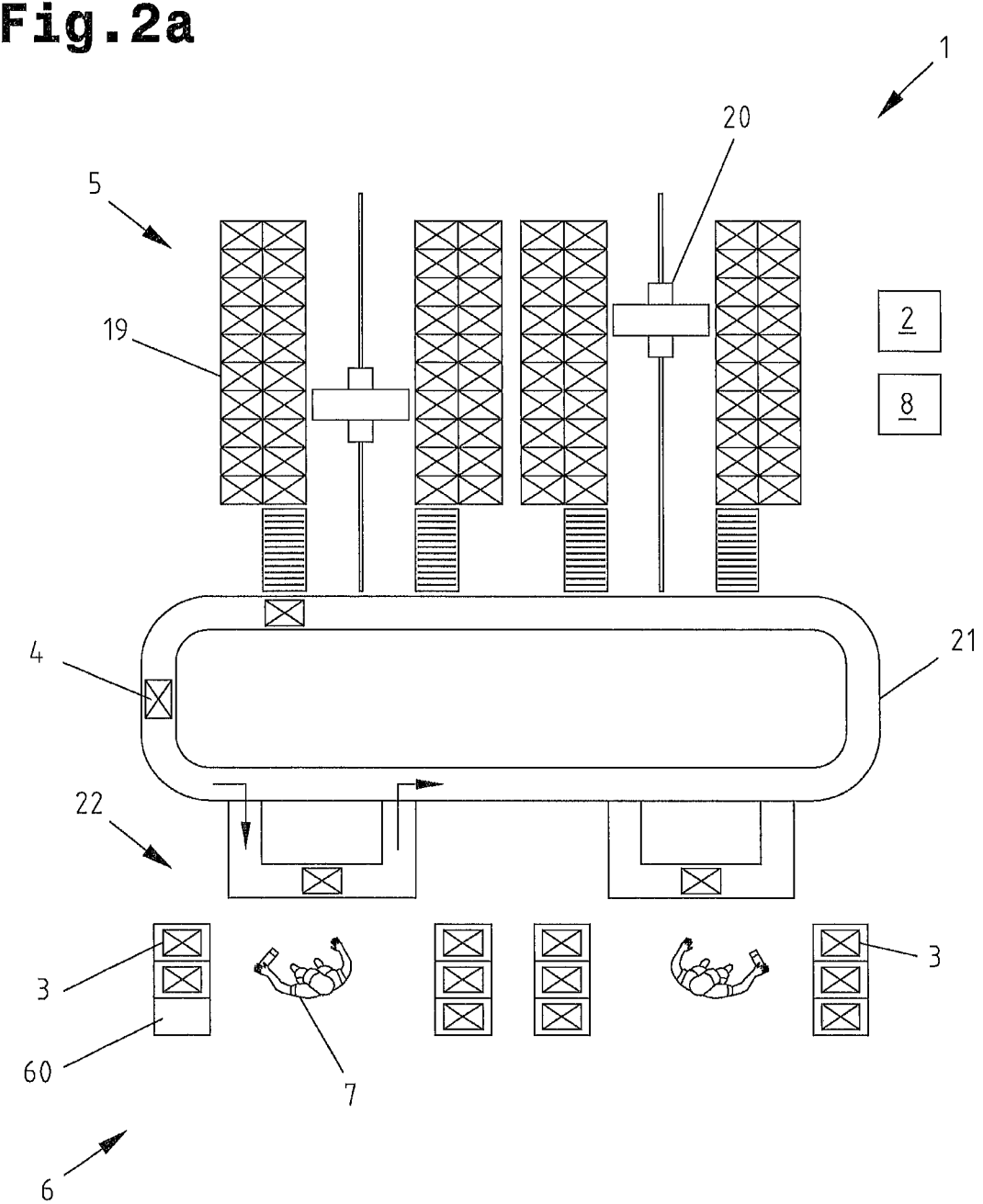
Figure 5:
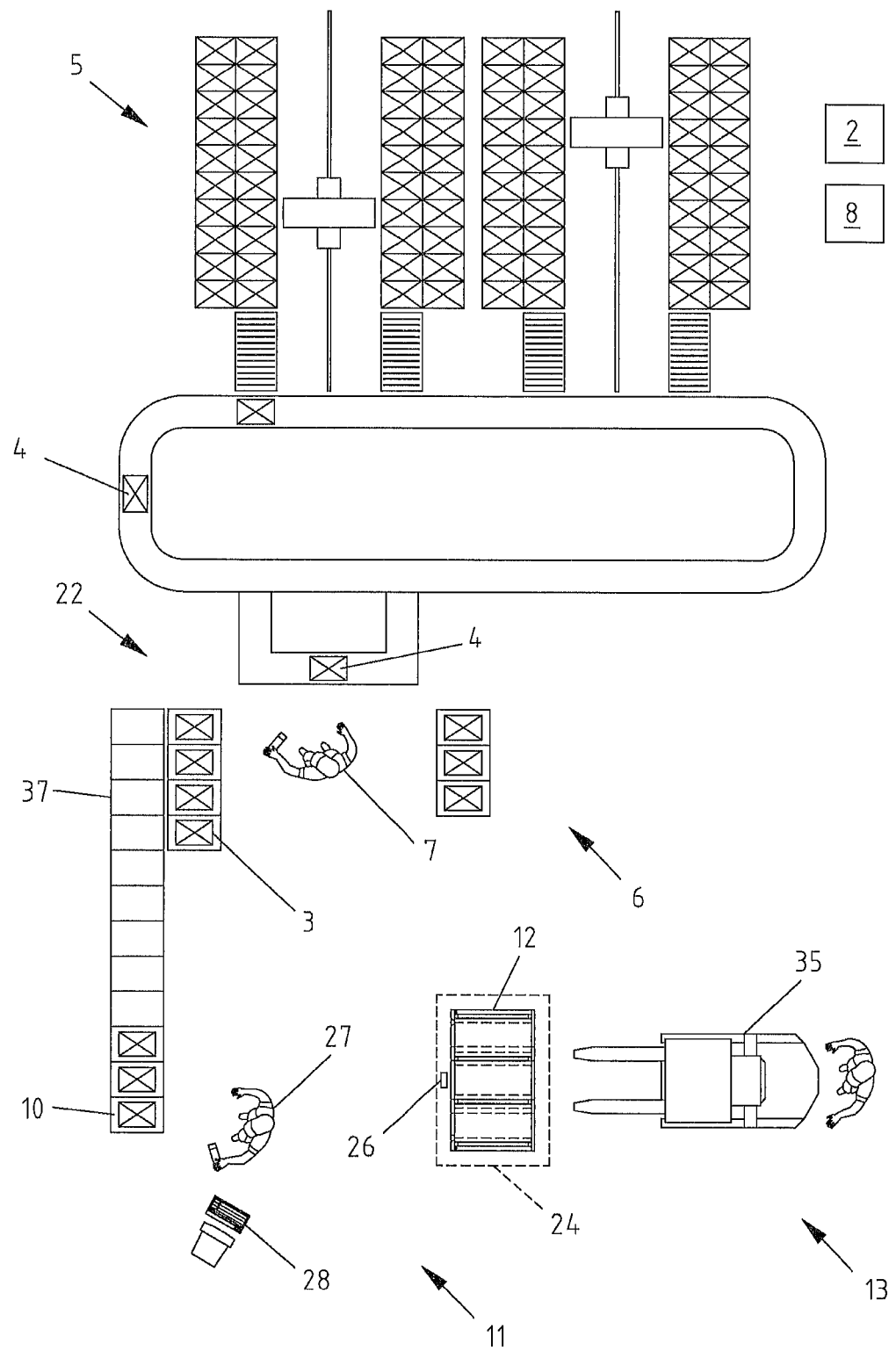
Figure 6:
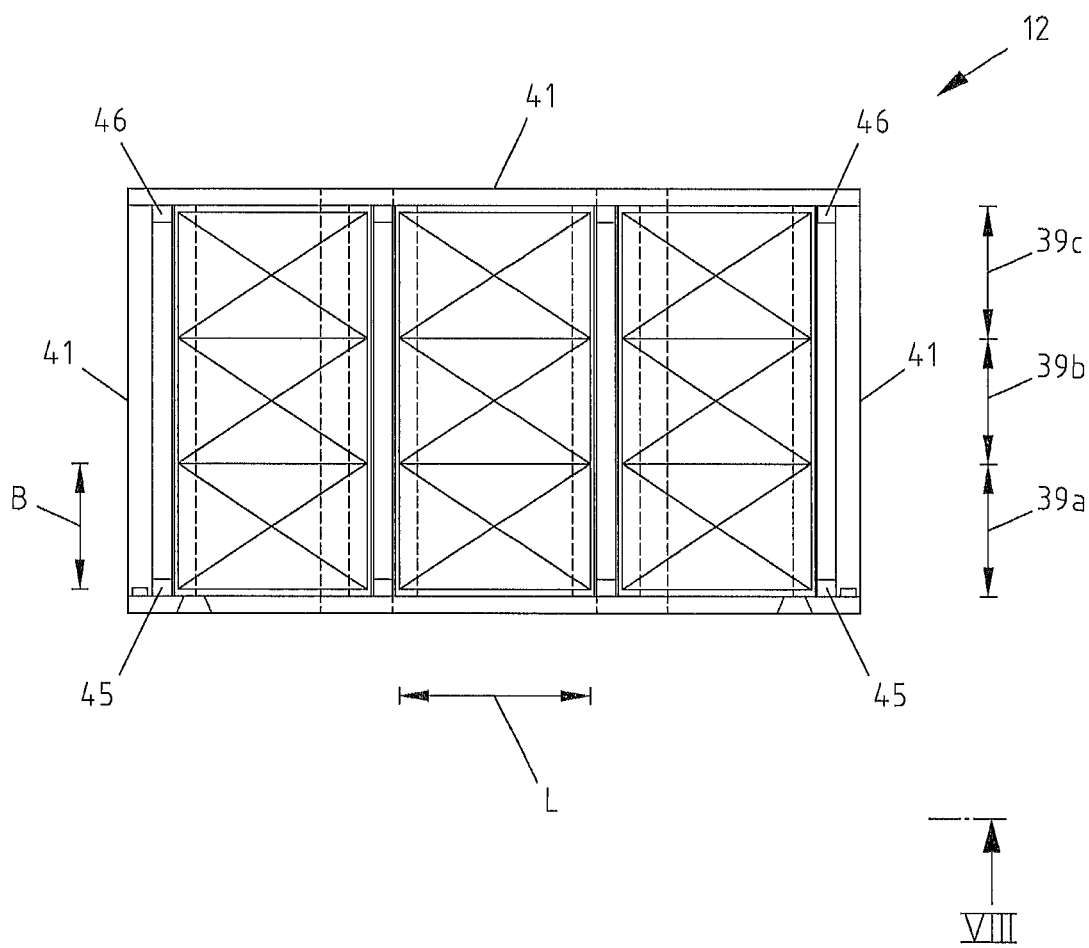
Figure 7:
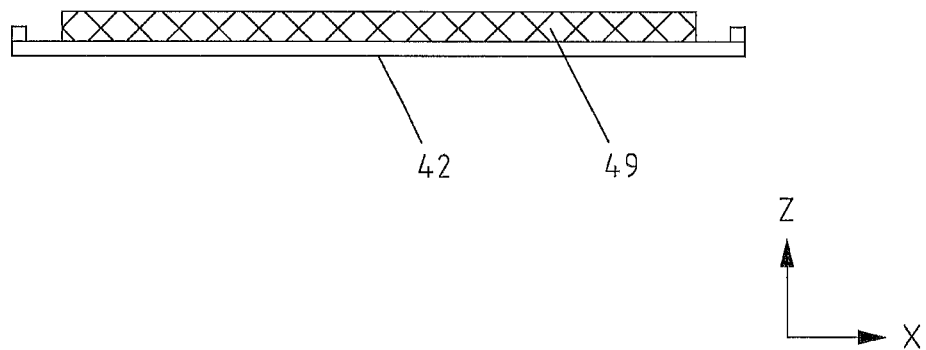
Figure 13:
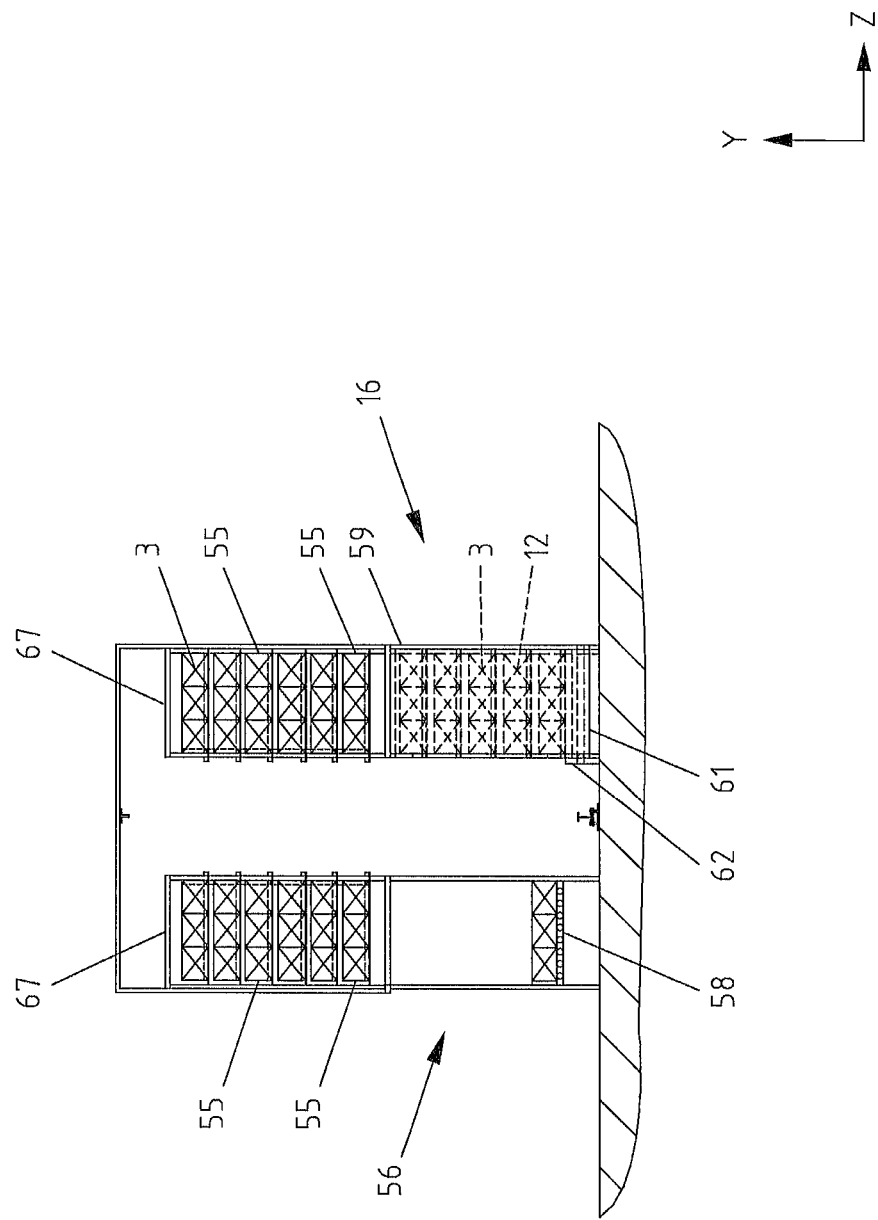

These are highly simplified, schematic diagrams illustrating the following:

FIG. 1 a block diagram of a system for delivering items;

FIG. 2a, 2b a plan view of a first embodiment of a supply depot for the system for delivering items, based on a first embodiment for a loading system for loading transport racks;

FIG. 3 a front view of a second embodiment for a loading system for loading transport racks;

FIG. 4 a side view of the loading system for loading transport racks from FIG. 3;

FIG. 5 a plan view of a second embodiment of a supply depot for the system for delivering items;

FIG. 6 a plan view of a transport rack for the delivery container along line VI indicated in FIG. 8;

FIG. 7 a plan view of a wall part that can be removed from the transport rack from FIG. 6;

FIG. 8 the transport rack viewed along line VIII indicated in FIG. 6;

FIG. 9 a side view of the transport rack from FIG. 6;

FIG. 10 a view in elevation of a buffer depot for the system for delivering items;

FIG. 11 the buffer depot from FIG. 10 viewed along line XI indicated in FIG. 12;

FIG. 12 the buffer depot in plan view along line XII indicated in FIG. 11;

FIG. 13 a front elevation of the buffer depot along line XIII indicated in FIG. 12;

FIG. 14 a plan view of a docking device for the provisioning system at the buffer depot, with a transport rack in the docking position.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 illustrates the system for delivering items in delivery containers and a goods dispatch system in the form of a block diagram. Items are ordered online by a consignee (customer) over the Internet on an order platform of a vendor (supplier). The order may also be placed over the telephone or via other media. Based on this customer order, an electronic picking order is generated in a supply depot 1 (FIG. 2a, 2b; 5). Hereafter, it is assumed that such picking orders were detected on a computer system 2 and forwarded to the supply depot 1 for picking (customer-specific) delivery containers 3. A picking order may comprise one delivery container 3 or a number of delivery containers 3, the delivery container 3 being a reusable container. By reusable container is meant a container, a bin and such like which is sent out from the supply depot 1 filled and returned for refilling by the vendor in the supply depot 1. The ordered item 4 is preferably placed in at least one bag, at least one carrier bag, at least one container, at least one cardboard box and similar, which are placed in the delivery container 3. The customer can remove his/her ordered item 4 from the delivery container 3 at the buffer depot and take the bag, carrier bags, etc., home. This enables rapid removal of the items 4 at the service location 58 (FIG. 12). In principle, however, an embodiment would also be conceivable whereby disposable containers are used as delivery containers which leave the buffer depot 53 and can be taken home by the customer.

Data relating to customer orders/picking orders is detected on the computer system 2. For example, consignee (customer) data relating to the home address, a desired delivery address, collection time and such like are managed. Based on the data of the customer order/picking order, a selected buffer depot 53 (collection depot) to which the ordered item 4 should be dispatched can also be detected on the computer system 2. Also detected is the storage location for the transport racks 12 that will be described below in order to determine the buffer depot 53 to which the transport rack 12 must be delivered to enable the consignee to pick up the item 4 of his/her order at the desired buffer depot 53 (or delivery address) at a desired collection time if necessary.

At the supply depot 1, such as that illustrated in FIGS. 2a, 2b by way of example, the items 4, for example from the food industry, are held in a storage system 5. The items 4 are usually stored on a loading aid, for example a pallet, tray or container, which is conveyed to a picking system 6 where items 4 belonging to a picking order are taken out of the loading aid and placed in at least one delivery container 3. Alternatively, the item 4 may also be packed in a cardboard box, which is then placed in the delivery container 3 as a packaging unit. The item 4 may also be a so-called "smallest retail unit" (stock keeping unit) or a "package", whereby a specific number of identical articles are packaged together in a plastic wrapping for example, constituting the minimum dispatch quantity for an order. The number of articles may also be just one item.

This type of picking is therefore based on the so-called "goods to man" principle. Accordingly, a picker 7 is assigned a fixed workstation and moves away from it as little as possible. The items 4 to be picked are transported to the picker 7, who places the items 4 in (empty or partially filled) delivery containers 4 in accordance with the picking orders. This picking principle is illustrated in FIG. 2a.

Alternatively, picking may also be operated on the so-called "man to goods" principle, in which case a picker moves between storage racks, takes the items 4 out of the storage racks and places them in the (customer-specific) delivery container 3. In this instance, the delivery container 3 is on a picking trolley which is moved by the picker.

The item 4 may also be automatically picked and hence the item 4 placed in/on the delivery container 3 by a loading robot.

Based on a first embodiment illustrated in FIG. 2b, the (customer-specific) delivery containers 3 may also be held in readiness in buffer areas 9 or based on a second embodiment illustrated in FIG. 5 in a buffer area 10.

In a loading system 11, the delivery containers 3 are then removed from the buffer area 9, 10 and loaded onto at least one transport rack 12. On average, customer orders usually comprise up to five delivery containers 3 so that (customer-specific) delivery containers 3 belonging to several picking orders are loaded onto one transport rack 12. In the case of a bigger customer order, (customer-specific) delivery containers 3 belonging to only a single picking order can be loaded onto a transport rack 12. Furthermore, a customer order may also comprise so many (customer-specific) delivery containers 3 that the latter have to be loaded on more than one transport rack 12.

This transport rack 12 may be loaded manually or automatically in accordance with a defined loading sequence, as described in detail below.

Adjoining the loading system 11 is a loading zone where the fully loaded transport racks 12 are transferred onto transport vehicles 14 (transport system) by a transfer system 13. Based on one possible embodiment, the transfer system 13 comprises fork-lift trucks which pick up the loaded transport racks 12 from the loading system 10 and load them onto the transport vehicles 14. The transport vehicles 14 are trucks, for example.

The transport racks 12 are then transported by the transport system 14, in particular a transport vehicle, from the supply depot 1 to a buffer depot 53 (FIG. 10) in a separate location. A supply depot 1 preferably delivers and supplies delivery containers 3 to several buffer depots 53. The fact that the supply depot 1 and buffer depots 53 are in different locations from one another is indicated by broken lines in FIG. 1. The distribution of buffer depots 53 is such that the decentralized buffer depots 53 are located so as to cover the area of a specific region, preferably at those points or locations where a high footfall can be expected.

The delivery containers 3 containing the picked items 4 are temporarily stored in the buffer depot 53 until they are collected from there by the consignee.

The transport racks 12 are unloaded from the transport vehicle and then transported to a provisioning system 16 by a receiving system 15. Again, this may be done using fork-lift trucks. For example, the receiving system 15 comprises a loading ramp alongside which the transport vehicle 14 docks and where the transport racks 12 are unloaded.

The delivery containers 3 containing the picked items 4 are then removed from the transport rack 12 by an automated storage and retrieval device 17 (FIG. 12) and either transferred to a storage system 18 (FIG. 11) or to an issuing system 56 (FIG. 10), as described in detail below. Beforehand, a wall part 42 has to be moved into an open position. The consignee can finally collect his/her ordered items 4 at the issuing system 56.

FIGS. 2a and 2b schematically illustrate a first embodiment of a supply depot 1. The supply depot 1 comprises the storage system 5 for storing the items 4, the picking system 6 for assembling the items 4 in delivery containers 3 in accordance with picking orders and for storing the delivery containers 3 containing the picked items 4, the loading system 11 for providing transport racks 12 and for loading delivery containers 3 onto the transport racks 12, and the transfer system 13 for transferring the transport racks 12 onto a transport vehicle 14.

The storage system 5 comprises stationary storage racks 19 and an automated goods distribution system by means of which the items 4 are retrieved from the storage racks 19 and conveyed to at least one picking station 22. If the items 4 are stored in a loading aid, it is not the items 4 as such that are conveyed by the goods distribution system but the loading aid containing the items 4. The goods distribution system has at least one rack stacker crane 20 and a conveyor system 21, for example roller conveyors, belt conveyors and such like, and the rack stacker crane 20 transports the items 4 between the storage racks 19 and the conveyor system 21. The conveyor system 21 links the at least one rack stacker crane 20 to the at least one picking station 22 and conveys the items 4 to the at least one picking station 22. If there are still items 4 left after the picking operation, these are transported by the conveyor system 21 back to the rack stacker crane 20 and placed back in storage in the storage rack 19. Accordingly, the conveyor system 21 is used to transport items 4 to the picking station 22 and transport (leftover) items 4 out of the picking station 22.

The storage racks 19 form a plurality of mutually adjacent storage compartments in rack levels one above the other, which in a depth direction (z-direction) provide a single storage space or several of them one after the other on which an item 4 can be respectively deposited.

The illustrated rack stacker crane is preferably a computer-controlled rack stacker crane 20 which is able to move between adjacent storage racks 19 in an aisle along tracks. The rack stacker crane 20 has a vertical mast, a platform mounted so that it can be raised and lowered on the vertical mast and a schematically indicated load receiving device by means of which the items 4 and/or loading aids can be stored and retrieved. Each rack stacker crane 20 serves two oppositely lying storage racks 19.

Also possible is a storage system 5 of the type known from WO 2013/090970 A2, for example.

Based on the embodiment illustrated, the picking system 6 comprises several picking stations 22 and at least one consolidation buffer 23. It might also be that only one picking station 22 is provided.

The picking station(s) 22 adjoins/adjoin the conveyor system 21 and it is on it/them that the items 4 are loaded into the (empty) delivery containers 3 in accordance with the picking orders. If the items 4 are stored in loading aids, the items 4 are taken out of the loading aids and transferred to the delivery containers 3 at the picking station 22 by a picker 7. However, this transfer may take place on an automated basis by a picker robot. The delivery containers 3 are placed in readiness on buffer areas 60 at the picking station 22 beforehand. Also before the picking operation, the (empty) delivery container 3 is assigned to a relevant customer order by reading an identification code. The identification code (data carrier 33, FIG. 8) is disposed on the delivery container 3 and is read by an identification unit, in particular a reading unit, at the picking station 22 and detected by the control system 8. To this end, the reading unit is connected to the control system 8. The data carrier 33 is a one-dimensional/two-dimensional barcode or a QR-Code (Quick Response Code) or an RFID label (Radio Frequency Identification Device). The reading unit is a hand scanner, as illustrated in FIG. 2a, or an RFID reading device, for example.

The buffer areas 60 may either be supplied with delivery containers 3 manually, in which case the picker 7 places the delivery containers 3 in the buffer areas 60, or may be supplied with delivery containers 3 on an automated basis, in which case the delivery containers 3 are conveyed to the buffer areas 60 and away from the buffer areas 60 by a delivery container distribution system, in particular an automated conveyor system. In the case of the latter embodiment, the buffer areas 60 may also be equipped with an automated conveyor system.

In FIG. 2, the delivery containers 3 are already in the position of readiness in the buffer areas 60. If five delivery containers 3 are needed for a picking order for example, these five delivery containers 3 can be provided to the picking station 22 and filled with the corresponding items 4. To this end, the items 4 are conveyed one after the other to the picking station 22 by the conveyor system 21.

Different embodiments of such "goods to man" picking systems are known from WO 2013/090969 A1 or EP 2 607 271 A1, for example.

The (filled) delivery containers 3 containing the picked items 4 can be sorted into order groups according to picking orders in the consolidation buffer 23. Accordingly, the delivery containers 3 containing the picked items 4 can be provided to buffer areas 9 in the consolidation buffer 23.

In the simplest situation, the consolidation buffer 23 is defined by a space on the depot floor in which a plurality of picking orders is sorted respectively to form an order group. Each order group is assigned at least one buffer area 9 for at least one delivery container 3. The buffer area 9 may also accommodate several delivery containers 3 which are aligned one after the other in at least one row. In FIG. 2b, buffer area 9.1 is occupied by delivery containers 3 of the first order group. Buffer areas 9.2, 9.3 are occupied by delivery containers 3 of the second order group. Another option is to provide parallel conveyor tracks and each conveyor track can accommodate a picking order and/or customer order as an order group. For example, a first picking order forms a first order group, a second picking order forms a second order group, etc. However, the delivery containers 3 may also be placed in stacks for each order group. For example, the delivery containers 3 in a first stack for the first picking order represent a first order group, the delivery containers 3 in a second stack for the second picking order represent a second order group, etc.

The delivery containers 3 are fed to the consolidation buffer 23 manually or automatically. For example, the picker 7 may bring the ready picked delivery containers 3 to the consolidation buffer 23 manually. Alternatively, the delivery container distribution system may also be connected to the consolidation buffer 23 by a conveyor so that the delivery containers 3 can be conveyed by the delivery container distribution system to the consolidation buffer 23 on an automated basis.

The delivery containers 3 for each picking order are then transferred to the transport racks 12 in the loading system 11. The loading system 11 comprises a storage area 24 for storing the transport racks 12, a first identification unit, in particular a first reading unit 25, and a second identification unit, in particular a second reading unit 26, as illustrated in FIG. 2b. The reading units 25, 26 are connected to the control system 8. It may also be that only a single reading unit is used, for example the first reading unit 25 which is connected to the control system 8. If the transport racks 12 are loaded by an operator 27, the loading system 11 also comprises an optical and/or acoustic operator control system with an input and/or output system 28 connected to the control system 8.

In this embodiment, the input and/or output system 28 is a PC (Personal Computer) with an input device (keyboard).

The at least one transport rack 12 is loaded with the delivery containers 3 in a loading sequence determined by the computer system 2 and the operator 27 receives loading instructions via the optical and/or acoustic operator control system 28 (input and/or output system), in particular what compartments (FIG. 8) of the transport rack 12 the delivery containers 3 should be placed in.

Based on one embodiment illustrated in FIGS. 3 and 4, the loading system 11 comprises a storage area 24 (not illustrated) for storing the transport racks 12, a first identification unit, in particular a first reading unit 25 and a second identification unit, in particular a second reading unit 26, and, if the transport racks 12 are loaded by an operator 27, at least one loading frame 29 and an electronic input and/or output system. However, it may be that only a single reading unit is used, for example the first reading unit 25. The loading frame 29 is preferably erected in a stationary arrangement in the region of the storage area 24 (FIG. 2b) and the transport rack 12 is positioned relative to the loading frame 29 and opposite it. The loading frame 29 and the electronic input and/or output system form an optical and/or acoustic operator control system.

The loading frame 29 has a plurality of loading openings 30 disposed one above the other and adjacent to one another which lie opposite the compartments 38 (FIG. 8) of the transport rack 12 when the transport rack 12 is aligned with the loading frame 29, as may be seen in FIG. 4. The number of loading openings 30 preferably corresponds to the number of compartments 38. To load a compartment 38 in the transport rack 12, an operator 27 must reach through a loading opening 30 and pass the delivery container 3 through the loading opening 30.

A control unit may be provided on the loading frame 29 above and/or underneath every loading opening 30. A control unit is therefore assigned to every loading opening 30. These control units constitute the input and/or output system 28 and are connected to the control system 8. The control units preferably comprise a display 31 and optionally a confirmation key 32 respectively. Instead of the confirmation key 32, a transmitter-receiver system may also be used to generate a radiation field for each control unit, which preferably lies in a plane in which a loading opening of the loading frame also lies. Naturally, every loading opening 30 may also have several transmitter-receiver systems for emitting radiation and for receiving the emitted radiation so that every loading opening is fully covered by a radiation field.

The display 31 comprises a display field by means of which a numeric or alphanumeric (visual) output of loading instructions can be provided. Once the transport racks 12 have been loaded, preferably in a pre-computed loading sequence, the operator 27 may be provided with a display indicating in which compartment 38 or in which compartments 38 and in which storage space 39a, 39b, 39c in the compartment 38 the delivery containers 3 should be placed. The number of delivery containers 3 to be placed in the compartment 38 can also be displayed. Based on a simpler system, just a single illuminating means may be used as the display 31, for example a light-emitting diode, in order to indicate to the operator 27 that specific delivery containers 3 should be loaded in a compartment 38 pre-selected by the computer system 2 and/or in compartments 38 pre-selected by the computer system 2.

The confirmation key 32 or the transmitter receiver system is connected to the computer system 2 and signals to the control system 8 when the loading of a compartment 38 with delivery containers 3 is complete.

Based on this embodiment, therefore, the at least one transport rack 12 can be loaded with delivery containers 3 in a loading sequence determined by the computer system 2.

When a transport rack 12 has been fully loaded, it is loaded onto a transport vehicle 14 by the transfer system 13. The transfer system 13 comprises at least one transfer device 35, for example a ground conveyor such as a hand pallet truck, electric pallet truck or fork-lift truck, which is controlled by an operator 36. Alternatively, the transfer device 35 may be provided in the form of an automatic ground conveyor such as a driverless transport system.

When the transport vehicle 14 is fully loaded, the transport racks 12 are transported from the supply depot 1 to a buffer depot 53.

FIG. 5 illustrates a second embodiment of the supply depot 1, which comprises the storage system 5 for storing the items 4, the picking system 6 for assembling the items 4 in delivery containers 3 in accordance with picking orders and for provisioning the delivery containers 3 containing the picked items 4, the loading system 11 for provisioning transport racks 12 and for transferring delivery containers 3 to the transport racks 12, and the transfer system 13 for loading the transport racks 12 onto a transport vehicle 14.

By contrast with the embodiment illustrated in FIGS. 2a, 2b, the picking system 6 comprises an automated conveyor system 37 which connects the picking system 6 and loading system 11 by conveyor means. The delivery containers 3 (containing the picked items 4) are grouped respectively into picking orders and conveyed from the at least one picking station 22 directly to the loading system 11. In the vicinity of the loading system 11, the conveyor system 37 serves as a buffer area 10 at which the delivery containers 3 arrive one after the other to be then loaded onto a transport rack 12. Again, the at least one transport rack 12 is loaded with delivery containers 3 in a loading sequence determined by the computer system 2 and the operator 27 receives loading instructions via the input and output system 28 (optical and/or acoustic operator control system), in particular in which compartments 38 (FIG. 8) in the transport rack 12 the delivery containers 3 should be placed. Although the loading system 11 illustrated in FIG. 5 is the same as that illustrated in FIGS. 2a, 2b, the loading system 11 illustrated in FIGS. 3, 4 could just as easily be used.

In both embodiments (FIGS. 2a, 2b; 5), the transport racks 12 may also be loaded with delivery containers 3 automatically by means of a loading robot and in accordance with a defined loading sequence. In such a situation, the electronic input and output system 28, 31, 32 and the optical and/or acoustic operator control system are not necessary.

It would also be conceivable to use a combination of manual and automatic loading of the transport racks 12 if the loaded delivery containers 3 are particularly heavy and it is more practical to opt for automatic loading rather than manual loading for ergonomic reasons.

FIGS. 6 to 9 illustrate different views of the transport rack 12. The transport rack 12 is essentially a (mobile) storage rack which has compartments 38 in horizontal shelf rows disposed one above the other and in adjacently disposed vertical shelf columns. These compartments 38 may provide a plurality of storage spaces 39a, 39b, 39c one behind the other. The transport rack 12 has a maximum width (x-direction) of 2100 mm, a maximum depth (z-direction) of 1500 mm and a maximum height (y-direction) of 2000 mm. It is preferable if at most five compartments 38 are provided one above the other and at most three compartments 38 adjacent to one another and the compartments 38 each have at most three storage spaces 39a, 39b, 39c. If the delivery containers 3 are containers or cardboard boxes with a length (L) of at most 700 mm, a width (B) of at most 600 mm and a height (H) of at most 400 mm, the transport rack 12 can be loaded with 45 delivery containers 3.

The transport rack 12 comprises a base plate 40, upright wall parts 41, 42 disposed thereon and a top plate 43 and one of the wall parts 42 can be moved between an open position and a closed position. In the open position (FIGS. 6, 8), the delivery containers 3 of all compartments 38 are accessible and in the closed position (FIG. 9), the delivery containers 3 of all compartments 38 are secured in place. As illustrated, the wall part 42 is provided in the form of a cover which can be removed from the transport rack 12. It is preferable to use so-called "quickrelease connectors" 44 to enable the transport rack 12 to be opened and closed rapidly. Based on another embodiment, the wall part 42 may also be articulatingly connected to the transport rack 12 by a hinge system, in which case the wall part 42 forms a door which can be pivoted between the open position and closed position. The wall part 42 may also be provided in the form of a roller which can be moved between the open position and closed position or a sliding wall which can be moved between the open position and closed position.

In the embodiment illustrated as an example, the transport rack 12 comprises a vertical (front) post 45 at the front and a vertical (rear) post 46 at the rear which are connected to one another by the base plate 40 and top plate 43. The wall parts 41 may be secured to the posts 45, 46. The compartments 38 are formed by angle sections 47 disposed at regular vertical and horizontal distances, which extend respectively between the front posts 45 and rear posts 46 and are secured thereto. The angle sections 47 have an L-shaped cross-section. Instead of angle sections 47, it would also be possible to use shelves which extend between the wall parts 41.

Accordingly, the transport rack 12 has a plurality of compartments 38 in storage levels one above the other (in a y-direction) and adjacent to one another (in an x-direction), which extend between the front face and rear face of the transport rack 12 (in a z-direction). These compartments may form more than one storage space, for example three storage spaces 39a, 39b, 39c (in a z-direction).

As may be seen from FIG. 9, a compartment depth 48 is bounded by the mutually opposite wall parts 41, 42 and is such that delivery containers 3 placed in a compartment 38 are able to slide between the wall parts 41, 42 to a limited degree only when the transport rack is being transported. The delivery containers 3 in the compartments 38 can thus be positioned against the wall parts 41, 42.

As described above, wall part 42 can be moved between an open position and a closed position and when the wall part 42 is in the closed position it acts as a position retaining means to limit or prevent a sliding movement of the delivery containers 3 in the compartments 30 when the transport rack 12 is being transported. As may be seen from FIGS. 6 and 9, there is only a slight gap between the rear delivery containers 3 and wall part 41 and the front delivery containers 3 and wall part 42. This makes allowance for size variations of the delivery containers 3. Alternatively, an elastic support element 49, for example a foam panel, may be provided on the internal face of at least one of the wall parts 41, 42, in particular the (displaceable) wall part 42, which generates a pressing force on the delivery containers 3 when the wall part 42 is moved into the closed position. As this happens, the delivery containers 3 are positioned against one another and the rear or front delivery container 3 is positioned against the wall part 41, 42. This being the case, the elastic support element 49 acts as a position retaining means. Although in this embodiment the elastic support element 49 co-operates with several compartments 38, an alternative option would be to provide an elastic support element 50 for each compartment 38. Also possible is an embodiment where the angle sections 47 form positive-fitting elements, for example the surface facing the base of the delivery containers 3 may be provided with raised areas. The storage spaces 39a, 39b, 39c are then separated from one another by the raised areas and the raised areas are only so high so that the operator 27 can still push the delivery containers 3 "effortlessly" into the compartments 38. The positive-fitting elements then act as position retaining means.

The base plate 40 comprises recesses 50 into which forks of a transfer device 35 can be moved, in particular a hand pallet truck, electric pallet truck or fork-lift truck, in order to lift the transport rack 12 off the ground and transport it. In the drawings, the illustrated recesses 50 are for forks of a fork-lift truck. Alternatively, the recesses 50 could also extend down to the floor surface, as indicated by broken lines in FIG. 8.

As may be seen from FIGS. 6, 8 and 9, the transport rack 12 is equipped with a positioning and centering means 51, enabling the transport rack 12 to be positioned and centered relative to the housing section 59 in the storage rack 67 in the buffer depot 53 (FIG. 10) when the transport rack 12 is placed in a docking position at the docking device 54 (FIG. 11, 13). In the docking position, the transport rack 12 is exactly positioned in an x-direction, y-direction and z-direction. In addition, the transport rack 12 can be secured in the docking position by means of a locking device 63 (FIG. 14). In the embodiment illustrated, two positioning and centering means 51 are provided, preferably disposed in the base plate 40.

In the embodiment illustrated, the positioning and centering means 49 has inclined positioning and centering surfaces 52 extending towards one another which enable the transport rack 12 to be positioned in the x-direction.

FIGS. 10 to 13 illustrate different views of the buffer depot 53. The buffer depot 53 comprises the receiving system 15 for the transport racks 12 delivered by means of the transport vehicle 14, the provisioning system 16 for providing transport racks 12 at a docking device 54, the automated storage and retrieval device 17 for removing the delivery containers 3 from the transport rack 12 and transferring at least some of the delivery containers 3 from the transport rack 12 to storage compartments 55, the storage system 16 with the storage compartments 55 for temporarily storing the delivery containers 3, at least one issuing station 56 with an input device 57 and at least one service location 58 to which the items in the delivery containers 3 can moved when requested by inputting a request command at the input device 57. The buffer depot 53 also has a control system 69 for the docking device 54, the storage and retrieval device 17, the input device 57 and the at least one service location 58. The request command is transmitted to the control system 69 which can switch the storage and retrieval device 17 from a (goods-in) storage mode to a direct retrieval mode by inputting the request command. The buffer depot 53 may also comprise a computer system 75. It is connected to the control system 69. The computer system 2 of the supply depot 1 and the computer system 75 of the buffer depot 53 are preferably connected to one another via a data transmission device, in particular a data line, such as a public communications network (Internet) or a communications network operated by the vendor (Intranet).

The receiving system 15 comprises a loading ramp, for example, at which the transport vehicle 14 docks and where the transport racks 12 are unloaded.

The provisioning system 16 for providing transport racks 12 is illustrated in more detail in FIG. 14 and comprises one or more docking devices 54. The docking device 54 is disposed in a housing section 59 provided in a storage rack 67 of the storage system 16. The docking device 54 comprises a stationary stand surface 61 on which the transport rack 12 can be placed, a positioning and centering means 62 and a locking device 63. The positioning and centering means 61 forms at least one positioning and centering surface 64 extending at an angle. In the embodiment illustrated, two positioning and centering means 62 are provided which cooperate with the positioning and centering means 51. The locking device 63 is a spring-biased stop 65 for example, which can be moved into position via an actuator drive, not illustrated (pneumatic drive, hydraulic drive and such like) in the direction towards the transport rack 12 placed on the stand surface 61.

FIG. 14 illustrates the transport rack 12, which is positioned by the positioning and centering means 51, 61 relative to the housing section 59 and relative to the storage rack 67 at least in the x-direction and is retained in position in the z-direction by the locking device 63. Positioning in the y-direction is effected by means of the stand surface 61. When the transport rack 12 is positioned in the x-, y- and z-directions, the transport rack 12 is located in the docking position.

In other words, in the docking position, the transport rack 12 is positioned and aligned with the storage compartments 55 such that the compartments 38 of the transport rack 12 are disposed exactly in the pattern of the storage compartments 55 of the storage racks 67 and lie within the access range of the storage and retrieval device 17. The storage and retrieval device 17 is now able to access the delivery containers 3 in the compartments 38.

The storage system 18 is disposed in a building and comprises stationary storage racks 67 and at least one storage and retrieval device 17, and the storage and retrieval device 17 transports the delivery containers 3 containing the items 4 of the customer orders between the transport racks 12 and storage racks 67 or the transport racks 12 and service desks 58.

The stationary first storage rack 67 (right-hand storage rack in FIG. 13) and stationary second storage rack 67 (left-hand storage rack in FIG. 13) form a plurality of mutually adjacent storage compartments 55 in rack levels lying one above the other having a single storage space or more than one storage space one behind the other in the depth direction (z-direction) on which a delivery container 3 can be placed respectively. The storage compartments 55 are formed by angle sections disposed at regular vertical and horizontal distances. If, instead of angle sections 47, the transport rack 12 comprises shelves, the storage racks 67 are also provided with shelves instead of angle sections. Accordingly, the same storage system is used for both the transport rack 12 and storage system 18.

In the bottom region, the first storage rack 67 (right-hand storage rack in FIG. 13) comprises the housing sections 59, in which a transport rack 12 can be interchangeably positioned respectively, and the storage compartments 55 lying above in an upper region. The first storage rack 67 may have only one housing section 59. In the bottom region, the second storage rack 67 (left-hand storage rack in FIG. 13) comprises the issuing stations 56 in which the at least one service location 58 is disposed respectively and storage compartments 55 lying above in an upper region. The second storage rack 67 may also have only one issuing station 56.

The illustrated storage and retrieval device 17 is a computer-controlled rack stacker crane which is able to move between adjacent storage racks 67 in an aisle along tracks. The storage and retrieval device 17 has a vertical mast, a platform which can be raised and lowered on the vertical mast and a schematically indicated load-receiving device 76 by means of which the delivery containers 3 can be manipulated.

Another option is a storage system 18 of the type known from WO 2013/090970 A2, for example.

The issuing station 56 illustrated in FIGS. 10 to 13 has the input device 57 and two service desks 58. The input device 57 is a touchscreen for example, by means of which a request command can be input when the consignee (customer) 68 wishes to collect the items 4 at the issuing station 56. Alternatively, the input device 57 may be a keyboard. Voice input is also possible. The input device 57 is connected to an electronic control system 69 which in turn computes the travel commands for the storage and retrieval device 17. The service locations 58 are respectively provided on a conveyor system, for example roller conveyors, belt conveyors and such like, and several delivery containers 3 can be accommodated on every conveyor system. Since an average customer order comprises four to six delivery containers, up to three delivery containers 3 can be received on each conveyor system. The service locations 58 are accessible via an access gate 71 which can be moved from a locked, closed position into an unlocked, open position. The access gates 71 are not unlocked or opened until the request command has been input. To this end, the access gate 71 is moved between the closed position and open position by an actuator drive (not illustrated), for example a pneumatic drive, hydraulic drive and such like. The actuator drive is connected to the control system 69 which in turn activates the actuator drive (not illustrated). Once the access gate 71 has been moved into the open position, the consignee (customer) 68 can take the items 4 from the delivery containers 3 away from the service location 58 and load them into his/her car 72.

The method for delivering items 4 in delivery containers 3 will be described below.

The dispatch of items 4 is initiated by an order placed over the telephone or Internet. The customer order, which may comprise one or more items 4, is electronically detected in the supply depot 1 by the computer system 2. Based on this customer order, at least one picking order is detected by the computer system 2. The picking order comprises one or more delivery containers 3 which will be packed with the ordered items 4. As described above, picking may be operated on the "goods to man" or "man to goods" picking principle.

Once the delivery containers 3 have been packed with the ordered items 4, the transport racks 12 are loaded. In this connection, it has proved to be of advantage if loading is not operated on a "chaotic" basis but rather in a loading sequence determined by the electronic computer system 2. In other words, a compartment 38 in the transport rack 12 is determined by the computer system 2 for every delivery container 3 for each picking order. To this end, the computer system 2 has a software program for computing the loading sequence.

The loading sequence may also take account of the storage spaces 39*a*, 39*b*, 39*c* in which the delivery containers 3 should be placed within a compartment 38. This is of particular advantage if a first customer order (or first picking order) comprises fewer delivery containers 3 than a compartment 38 has storage spaces 39*a*, 39*b*, 39*c*. If a compartment 38 is able to accommodate three delivery containers 3 on three storage spaces 39*a*, 39*b*, 39*c* and the customer order comprises two delivery containers 3, the two delivery containers 3 are loaded into the rear storage spaces 39*b*, 39*c*. When a second customer order (or second picking order) is detected on the computer system 2, one delivery container 3 from this order can be loaded into the same compartment 38 where the front storage space 39*a* is still free. In other words, the computer system 2 can define a loading zone 73.1 (FIG. 9) when determining the loading sequence within a compartment 38.

Alternatively, a first customer order (or first picking order) may comprise more delivery containers 3 than there are storage spaces 39*a*, 39*b*, 39*c* in a compartment 38. If a compartment 38 is able to accommodate three delivery containers 3 in three storage spaces 39*a*, 39*b*, 39*c* and the customer order comprises five delivery containers 3, three delivery containers 3 will be loaded in a first compartment 38 and two delivery containers 3 in a second compartment 38. The compartments 38 for the delivery containers 3 of the first customer order (or first picking order) are preferably directly adjacent to one another. The loading sequence may therefore define a loading zone 73 spanning several compartments 38. This loading zone is allocated to the first customer order (or first picking order).

This is also of particular advantage if there are several customer orders (or picking orders) and each of them occupies all the storage spaces 39*a*, 39*b*, 39*c* of one or more compartments 38 with delivery containers 3. For example, three customer orders (or picking orders) were detected on the computer system 2, each of which comprises six delivery containers 3. If each compartment 38 has three storage spaces 39*a*, 39*b*, 39*c*, the computer system 2 will determine three loading zones 73.2, 73.3, 73.4 when computing the loading sequence. As schematically indicated in FIG. 8, the delivery containers 3 of the first customer order will be loaded onto the first loading zone 73.2 comprising two directly adjacent compartments 38, the delivery containers 3 of the second customer order will be loaded into the second loading zone 73.3 comprising two directly adjacent compartments 38 and the delivery containers 3 of the third customer order will be loaded into the third loading zone 73.4 comprising two directly adjacent compartments 38. The loading zones 73.2, 73.3, 73.4 may lie adjacent to one another or be distributed around the transport rack 12.

If the transport rack 12 is loaded by the operator 27, he/she will output on the operator control system, in particular the optical and/or acoustic output system 28, 31 (FIG. 2*b*; FIG. 3), loading instructions based on the loading sequence determined beforehand by the computer system 2, in particular the compartments 38 and/or storage spaces 39*a*, 39*b*, 39*c* (FIG. 8) in the transport rack 12 in which the delivery containers 3 are to be placed. In the case of automatic loading of the transport rack 12, such an output system 28, 31 is not strictly necessary.

Before the transport rack 12 is (manually/automatically) loaded, the delivery containers 3 are identified on the basis of data, for example an identification code, read from the data carrier 33 (this is illustrated only once in FIG. 8 with a view to retaining greater clarity) by means of a first detection unit 25 (reading unit) and detected by the computer system 2.

The data carrier 33 is a one-dimensional/two-dimensional barcode, or a QR Code (Quick Response Code), or an RFID label (Radio Frequency Identification Device). In the case of manual loading, the first detection unit 25 is a portable reading device, for example a hand scanner, whereas in the case of automatic loading, the first detection unit 25 is a stationary reading device disposed in the region of the buffer area 9, 10. The detection unit 25 may also be an RFID reading device.

The transport rack 12 is likewise identified prior to loading on the basis of data read from the data carrier 34 (FIG. 8) by means of the second detection unit 26 (reading unit), for example an identification code, and detected by the computer system 2. The data carrier 34 is a one-dimensional/two-dimensional barcode, or a QR Code (Quick Response Code), or an RFID label (Radio Frequency Identification Device). The second detection unit 25 is a stationary reading device (barcode reading device or RFID reading device) disposed in the region of the storage area 24.

It is therefore possible to unambiguously allocate the (identified) delivery containers 3 to a transport rack 12 and the computer system 2 predefines which delivery containers 3 are to be loaded into which transport rack 12 if several transport racks 12 are being held in readiness in the loading system 11 at the same time.

As already described above, it may be that only one detection unit is used to read the data carrier 33 on the delivery container 3 on the one hand and the data carrier 34 on the transport rack 12 on the other hand.

Furthermore, the computer system 2, in particular an electronic evaluation module, may evaluate or will know which delivery containers 3 for the respective picking orders are on which transport rack 12 and in which compartment 38 the delivery containers 3 are being held. An evaluation may optionally also be run to ascertain which delivery containers 3 have been placed in which storage spaces 39a, 39b, 39c for the respective picking orders.

The computer system 75 may then optionally also be notified of a selected buffer depot 53 (if there are several buffer depots 53), data pertaining to the customer order/picking order and/or data pertaining to the transport racks 12 to be dispatched, for example the storage spaces of the delivery containers 3 in the compartments 38 and/or storage spaces of the delivery containers 3 in the storage spaces 39a, 39b, 39c. The computer system 75 therefore knows where the delivery containers 3 for respective picking orders are stored in the transport rack 12. To this end, the data is electronically transmitted from computer system 2 to computer system 75 or computer system 75 may retrieve the data from computer system 2. Alternatively, this data may also be stored on the data carrier 34 (of the transport rack 12) and can then be read by the detection unit 74 (reading unit). This data is then transmitted to the computer system 75.

As soon as the transport rack 12 has been fully loaded with the delivery containers 3, it is transported from the supply depot 1 to the buffer depot 53 by the transport system 14 described above. Before this, the computer system 2 determines, based on the customer order (home address of the consignee or a delivery address) which buffer depot 53 the transport rack 12 must be delivered to if there is a plurality of buffer depots 53. On arrival there, the transport rack 12 is transferred from the transport system 14 to the receiving system 15. Here, the transport rack 12 is identified by a detection unit 74 on the basis of data, for example an identification code or an identification code and data relating to the loading sequence, read by the detection unit 74 from the data carrier 34 (FIG. 8) and detected by the computer system 75.

The detection unit 25 is a portable reading device or a stationary reading device disposed on the receiving system 15, for example a barcode reading device or RFID reading device. The detection unit 74 is connected to the control system 69. The control system 69 is in turn connected to the computer system 75.

For example, the transport rack 12 is unloaded from the transport vehicle 14 and then identified by the detection unit 74. Since the transport rack 12 has been identified, the notified data can also be accessed and the storage and retrieval device 17 activated accordingly.

At the provisioning system 16, the transport rack 12 is then transported to one of optionally several housing sections 59. This may be done using a hand pallet truck, electric pallet truck and such like (not illustrated in FIG. 12). Alternatively, a roller carpet may also be provided on the receiving system 15, on which the transport rack 12 can be transported to and pushed into the housing sections 59. In addition, the wall part 42 is moved into an open position, in particular is removed from the transport rack 12. FIGS. 11 to 13 illustrate, for example, two loaded transport racks 12' and one transport rack 12" that has already been unloaded in the docking position, in which the wall part 42 is in the open position, the wall part 42 having been removed in particular. The storage and retrieval device 17, in particular the load-receiving device 76, is therefore able to access the compartments 38. FIGS. 11 and 12 illustrate how the storage and retrieval device 17, in particular the load-receiving device 76, has removed the delivery containers 3 from a (uppermost) compartment 38 of the transport rack 12'. These delivery containers 3 are taken to the (middle) collection station 56 for example, from where the consignee 68 has requested his/her items 4, and placed on the service location 58.

The left-hand housing section 59 is free. The empty transport rack 12 has therefore been removed. Disposed in the housing section 59 is the docking device 54 (FIG. 12, 14) where the transport rack 12 is held in readiness in a docking position. The docking position may be monitored by means of a sensor system, not illustrated. In the docking position, the compartments 38 are located within the access range of the storage and retrieval device 17.

The storage and retrieval device 17 can then start to take the delivery containers 3 out of the transport rack 12 and transfer the delivery containers 3 either to the storage system 18 or to the issuing system 56.

Transferring the Delivery Containers to the Storage System

If there is no request command currently pending and a customer order has not yet been requested at the issuing station 56, the storage and retrieval device 17 (FIG. 12) can remove the delivery containers 3 from the transport rack 12 and transfer them to the storage system 18. The storage and retrieval device 17 may remove all the delivery containers 3 needed for a picking order from a compartment 38 using the load-receiving device 76. Such a load-receiving device 76 is known from EP 1 697 251 B1, for example. As described above, therefore, the delivery containers in compartment 38 disposed one behind the other in storage spaces 39a, 39b, 39c can be picked up by the load-receiving device 76, transported together to a storage compartment 55 and stored in it.

The storage and retrieval device 17 (FIG. 12) cannot take the delivery containers 3 out of storage compartment 55 and transfer them to the issuing system 56 until a later point in time at which the transport rack 12 has been made available at the docking device 54, a request command has been input and the customer order has been requested at the issuing station 56. Then, the storage and retrieval device 17 can take all the delivery containers 3 needed for a picking order out of a storage compartment 38 by means of the load-receiving device 76 and transport them together to the issuing system 56.

Transferring the Delivery Containers to the Issuing System

If a request command is currently pending and a customer order was requested at the issuing station 56, the storage and retrieval device 17 (FIG. 12) can transfer the delivery containers 3 directly from the transport rack 12 and transfer them to the issuing system 56, as illustrated in FIG. 12. Prompted by the request command, the storage and retrieval device 17 is switched from storage mode to direct retrieval mode by the control system 69. The storage and retrieval device 17 can then take all the delivery containers 3 needed for a picking order out of a compartment 38 by means of the load-receiving device 76. The delivery containers 3 in the compartment 38 disposed one behind the other in storage spaces 39a, 39b, 39c can be picked up by the load-receiving device 76 and transported together to the issuing station 56 (the left-hand issuing station 56 with the empty service location 58 in FIG. 12).

The step involving the transfer to the storage system 18 can therefore be dispensed with and so-called "rush orders" can therefore be handled very rapidly.

Based on both embodiments, the request command is initiated by entering it at the input device 57. The storage and retrieval device 17 is activated accordingly by the control system 69. For example, the input may entail detection of a code or order number and such like.

Finally, the consignee 68 can collect his/her ordered items 4 at the issuing system 56. The delivery containers 3 transferred by the storage and retrieval device 17 to the issuing system 56 are held in readiness on one or more service locations 58.

The item 4 is preferably packed in at least one bag which is placed in the delivery container 3 so that the consignee 68 merely has to take the bag out of the delivery container 3. The empty delivery containers 3 are then collected from the issuing system 55 by the storage and retrieval device 17 and loaded onto an empty/partially empty transport rack 12 (see FIG. 12 transport rack 12″). The empty delivery containers 3 are thus returned to storage.

The transport racks 12 with the empty delivery containers 3 are then transported from the buffer depot 53 to the supply depot 1 where they can be used again.

The embodiments illustrated as examples represent possible variants of the system for delivering items, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

Above all, the individual embodiments of the subject matter illustrated in FIGS. 1 to 14 constitute independent solutions proposed by the invention in their own right.

For the sake of good order, finally, it should be pointed out that, in order to provide a clearer understanding of the structure of the transport vehicle and guide unit, they and their constituent parts are illustrated to a certain extent out of scale and/or on an enlarged scale and/or on a reduced scale.

| List of reference numbers | |
| --- | --- |
| 1 | Supply depot |
| 2 | Computer system |
| 3 | Delivery container |
| 4 | Item |
| 5 | Storage system |
| 6 | Picking system |
| 7 | Picker |
| 8 | Control system |
| 9 | Buffer area |
| 10 | Buffer area |
| 11 | Loading system |
| 12 | Transport rack |
| 13 | Transfer system |
| 14 | Transport system |
| 15 | Receiving system |
| 16 | Provisioning system |
| 17 | Storage and retrieval device |
| 18 | Storage system |
| 19 | Storage rack |
| 20 | Rack stacker crane |
| 21 | Conveyor system |
| 22 | Picking station |
| 23 | Consolidation buffer |
| 24 | Storage area |
| 25 | Detection unit |
| 26 | Detection unit |
| 27 | Operator |
| 28 | Input and/or issuing system |
| 29 | Loading frame |
| 30 | Loading opening |
| 31 | Display |
| 32 | Confirmation key |
| 33 | Data carrier delivery container |
| 34 | Data carrier transport rack |
| 35 | Transfer device |
| 36 | Operator |
| 37 | Conveyor system |
| 38 | Compartment |
| 39 | Storage space |
| 40 | Base plate |
| 41 | Wall part |
| 42 | Wall part |
| 43 | Top plate |
| 44 | Quick release connector |
| 45 | Front post |
| 46 | Rear post |
| 47 | Angle section |
| 48 | Compartment depth |
| 49 | Support element |
| 50 | Recess |
| 51 | Positioning and centering means |
| 52 | Positioning and centering surface |
| 53 | Buffer depot |
| 54 | Docking device |
| 55 | Storage compartment |
| 56 | Issuing station |
| 57 | Input device |
| 58 | Service location |
| 59 | Housing section |
| 60 | Buffer area |
| 61 | Stand surface |
| 62 | Positioning and centering means |
| 63 | Locking device |
| 64 | Positioning and centering surface |
| 65 | Stop |
| 66 | Building |
| 67 | Storage rack |
| 68 | Consignee |
| 69 | Control system |
| 70 | |
| 71 | Access gate |
| 72 | Truck |
| 73 | Loading zone |
| 74 | Detection unit |

| List of reference numbers | |
|---|---|
| 75 | Computer system |
| 76 | Load-receiving device |

The invention claimed is:

1. A method for delivering items (4) in delivery containers (3), comprising the steps:
   i) providing the items (4),
   ii) picking the items (4) in delivery containers (3) in accordance with picking orders,
   iii) providing at least one transport rack (12) having compartments (38) in horizontal shelf rows disposed one above the other and in adjacently disposed vertical shelf columns and to which a data carrier (34) is attached,
   iv) identifying the at least one transport rack (12) by means of a detection unit (25, 26) by reading the data carrier (34) and recording data on a first computer system (2),
   v) loading the at least one transport rack (12) with the delivery containers (3) for one or more picking orders,
   vi) transferring the at least one transport rack (12) to a transport system (14),
   vii) transporting the at least one transport rack (12) by means of the transport system (14) from a supply storage system (1) in which steps i) to vi) are executed to a buffer storage system (53),
   viii) providing the at least one transport rack (12) in a docking device (54) in the buffer storage system (53),
   ix) removing the delivery containers (3) from the transport rack (12) by means of an automated storage and retrieval device (17),
   x) transferring at least some delivery containers (3) from the transport rack (12) to storage compartments (55) in the buffer storage system (53),
   xi) transporting the at least one delivery container (3) for a picking order to an issuing station (56) in the buffer storage system (53) at which the items (4) in the delivery containers (3) are made available for collection from at least one service location (58) if they have been requested by inputting a request command at the issuing station (56),
   wherein
   a loading arrangement for the delivery containers (3) for picking orders is determined by the first computer system (2) before step v), the loading arrangement takes into account a sorting of delivery containers (3) according to the picking orders and by means of which the storage positions of the delivery containers (3) in the compartments (38) and/or the storage positions of the delivery containers (3) in storage spaces (39a, 39b, 39c) in the compartments (38) are determined, and
   the at least one transport rack (12) is loaded with the delivery containers (3) in step v) in the loading arrangement determined by the first computer system (2) in the compartments (38) in horizontal shelf rows disposed one above the other and/or adjacently disposed vertical shelf columns, and
   after step vii), the at least one transport rack (12) is transferred from the transport system (14) to a receiving system (15) in the buffer storage system (53) and the at least one transport rack (12) is identified by means of a detection unit (74) provided on the receiving system (15) by reading the data carrier (34) and recording data on a second computer system (75) in the buffer storage system (53), and data relating to the loading arrangement is provided on the second computer system (75) after the at least one transport rack (12) has been loaded with the delivery containers (3) in the supply storage system (1), and
   the at least one transport rack (12) is provided at the docking device (54) in the buffer storage system (53) in such a manner that the compartments (38) in horizontal shelf rows disposed one above the other and adjacently disposed vertical shelf columns lie within the access range of the automated storage and retrieval device (17) and the automated storage and retrieval device (17) is able to access the delivery containers (3) in these compartments (38), and
   while the transport rack (12) is provided at the docking device (54), the delivery containers (3) are transferred by the automated storage and retrieval device (17) from the compartments (38) either to the storage compartments (55) in the buffer storage system (53) if they have not yet been requested at the issuing station (56) or to the service location (58) if they have been requested at the issuing station (56).

2. The method according to claim 1, wherein in a compartment (38), the transport rack (12) has a single storage space (39a) in which the delivery container (3) is deposited or in a compartment (38), the transport rack (12) has a plurality of storage spaces (39a, 39b, 39c) one behind the other in which a plurality of delivery containers (3) are deposited.

3. The method according to claim 1, wherein the transport rack (12) has a maximum of five compartments (38) one above the other and a maximum of three compartments (38) adjacent to one another and the compartments (38) each have a maximum of three storage spaces (39a, 39b, 39c) so that a transport rack (12) can be loaded with a maximum of 45 delivery containers (3), wherein the delivery container (3) has a length (L) of at most 700 mm, a width (W) of at most 600 mm and a height (H) of at most 400 mm.

4. The method according to claim 1, wherein the delivery containers (3) are positioned in the compartment (38) against at least one position retaining means (41, 42) if the delivery containers (3) slide in the compartments (38) during transportation of the transport rack (12) or are held in a fixed position by at least one position retaining means (49) to prevent a sliding movement of the delivery containers (3) in the compartments (38).

5. The method according to claim 1, wherein after picking the items (4) in step ii), the delivery containers (3) are transported to a loading system (11) where the transport racks (12) are also provided and loaded with the delivery containers (3), and before loading the transport racks (12) the delivery containers (3) are also identified by means of a detection unit (25), and the delivery containers (3) are allocated to the respective transport rack (12) and to the respective compartments (38) in the transport rack (12) by the first computer system (2).

6. The method according to claim 1, wherein the supply storage system (1) comprises the first computer system (2) and the buffer storage system (53) comprises the second computer system (75) which are connected to one another in order to exchange data via a data transmission device (data line) and after loading the transport rack (12) in the supply storage system (1), data relating to the loading arrangement is transmitted to the second computer system (75).

7. The method according to claim 1, wherein the data carrier (34) on the transport rack (12) contains an identification code and data relating to the loading arrangement.

8. The method according to claim 1, wherein the first computer system (2) determines a loading zone (73.1, 73.2, 73.3, 73.4) for every picking order of a plurality of picking orders when determining the loading arrangement and the loading zone (73.1, 73.2, 73.3, 73.4) may comprise one compartment (38) or several compartments (38) so that a number of delivery containers (3) are available in a loading zone (73.1, 73.2, 73.3, 73.4).

9. The method according to claim 8, wherein the storage and retrieval device (17) removes a maximum number of delivery containers (3) for a picking order from the loading zone (73.1, 73.2, 73.3, 73.4) of the at least one transport rack (12).

10. The method according to claim 1, wherein the data carrier (34) on the transport rack (12) contains an identification code as data.

11. The method according to claim 10, wherein before providing the at least one transport rack (12) at the docking device (54) in the buffer storage system (53), the transport rack (12) is identified by means of the detection unit (74) and the identification code is transmitted to the computer system (75) of the buffer storage system (53), whereupon this transport rack (12) is provided at the docking device (54).

12. A system for delivering items (4) in delivery containers (3), comprising
a supply storage system (1), which comprises at least
a storage system (5) for providing the items (4),
a picking system (6) for picking the items (4) in accordance with picking orders in delivery containers (3) and for providing the delivery containers (3) containing the picked items (4),
a loading system (11) for providing the transport racks (12) and for transferring the delivery containers (3) to at least one transport rack (12), the transport racks (12) each having compartments (38) in horizontal shelf rows disposed one above the other and in adjacently disposed vertical shelf columns and to each of which a data carrier (34) is attached, wherein the transport racks (12) receive the delivery containers (3) for one or more picking orders, and the loading system (11) having a detection unit (25, 26) for identifying the at least one transport rack (12) by reading the data carrier (34) on the transport rack (12),
a first computer system (2) for recording data of the data carrier (34) and for determining a loading arrangement for loading the at least one transport rack (12) with the delivery containers (3) in the loading arrangement in the compartments (38) in horizontal shelf rows disposed one above the other and/or in adjacently disposed vertical shelf columns, wherein the loading arrangement takes into account a sorting of delivery containers (3) according to picking orders and wherein the storage positions of the delivery containers (3) in the compartments (38) and/or storage positions of the delivery containers (3) in storage spaces (39a, 39b, 39c) in the compartments (38) are determined by the loading arrangement,
a transfer system (13) for transferring the at least one transport rack (12) to a transport system (14), and
a transport system (14) for transporting the at least one transport rack (12) from the supply storage system (1) to a buffer storage system (53), and
a buffer storage system (53), which comprises
a receiving system (15) for the transport racks (12) delivered by means of the transport system (14), wherein the receiving system (15) is provided with a detection unit (74) for identifying the at least one transport rack (12) by reading the data carrier (34) on the transport rack (12),
a providing system (16) for providing transport racks (12) at least one docking device (54),
an automated storage and retrieval device (17) for removing the delivery containers (3) from the transport rack (12) and transferring at least some delivery containers (3) from the transport rack (12) to storage compartments (55),
storage compartments (55) for temporarily storing the delivery containers (3),
at least one issuing station (56) having an input device (57) and at least one service location (58) at which the items (4) in the delivery containers (3) are made available if they have been requested by inputting a request command at the input device (57),
a second computer system (75) for recording data from the data carrier (34) and data relating to the loading arrangement which is provided after loading the at least one transport rack (12) in the supply storage system (1),
wherein the at least one docking device (54) for the transport rack (12) which positions the at least one transport rack (12) in such a manner that the compartments (38) formed by the horizontal shelf rows disposed one above the other and adjacently disposed vertical shelf columns lie within the access range of the automated storage and retrieval device (17) and the automated storage and retrieval device (17) is able to access the delivery containers (3) in these compartments (38), and
while the transport rack (12) is provided at the docking device (54), the automated storage and retrieval device (17) transfers them from the compartments (38) either to the storage compartments (55) in the buffer storage system (53) if they have not yet been requested at the issuing station (56) or to at least one service location (58) if they have been requested at the issuing station (56).

13. The system according to claim 12, wherein the transport rack (12) comprises a base plate (40), wall parts (41, 42) extending up therefrom and a top plate (43), wherein one of the wall parts (42) can be moved between an open position and a closed position, wherein in the open position the delivery containers (3) of all the compartments (38) are accessible and in the closed position the delivery containers (3) of all the compartments (38) are secured in place.

14. The system according to claim 12, wherein the transport rack (12) has a maximum width of 2100 mm, a maximum depth of 1500 mm and a maximum height of 2000 mm.

15. The system according to claim 12, wherein the transport rack (12) has at most five compartments (38) one above the other and at most three compartments (38) adjacent to one another and the compartments (38) each have at most three storage spaces (39a, 39b, 39c).

16. The system according to claim 12, wherein the storage compartments (55) are provided in at least one stationary storage rack (67) in horizontal shelf rows disposed one above the other and in adjacently disposed vertical shelf columns, wherein at least one of the storage racks (67) forms a housing section (59) in which the docking device (54) is provided so that when the transport rack (12) is positioned at the docking device (54), the transport rack (12) forms a storage section of the at least one storage rack (67) by means of the compartments (38).

17. The system according to claim 12, wherein the transport rack (12) has at least one position retaining means (41, 42) against which the delivery containers (3) in the compartments (38) are positioned if the delivery containers (3) slide in the compartments (38) during transportation of the transport rack (12) or at least one position retaining means (49) by means of which the delivery containers (3) placed in the compartments (38) are held in a fixed position to prevent a sliding movement of the delivery containers (3) in the compartments (38).

18. The system according to claim 12, wherein the supply storage system (1) comprises the first computer system (2) and the buffer storage system (53) comprises the second computer system (75) which are connected to one another in order to exchange data via a data transmission device in order to transmit data relating to the loading arrangement to the second computer system (75) after loading the transport rack (12) in the supply storage system (1).

19. A method for delivering items (4) in delivery containers (3), comprising the steps:
  i) providing the items (4),
  ii) picking the items (4) in delivery containers (3) in accordance with picking orders,
  iii) providing at least one transport rack (12) having compartments (38) in horizontal shelf rows disposed one above the other and in adjacently disposed vertical shelf columns and to which a data carrier (34) is attached,
  iv) identifying the at least one transport rack (12) by means of a detection unit (25, 26) by reading the data carrier (34) and recording data on a first computer system (2),
  v) loading the at least one transport rack (12) with the delivery containers (3) for one or more picking orders,
  vi) transferring the at least one transport rack (12) to a transport system (14),
  vii) transporting the at least one transport rack (12) by means of the transport system (14) from a supply storage system (1) in which steps i) to vi) are executed to a buffer storage system (53),
  viii) providing the at least one transport rack (12) in a docking device (54) in the buffer storage system (53),
  ix) removing the delivery containers (3) from the transport rack (12) by means of an automated storage and retrieval device (17),
  x) transferring at least some delivery containers (3) from the transport rack (12) to storage compartments (55) in the buffer storage system (53),
  xi) transporting the at least one delivery container (3) for a picking order to an issuing station (56) in the buffer storage system (53) at which the items (4) in the delivery containers (3) are made available for collection from at least one service location (58) if they have been requested by inputting a request command at the issuing station (56),
  wherein
    a loading arrangement for the delivery containers (3) for picking orders is determined by the first computer system (2) before step v) by means of which the storage positions of the delivery containers (3) in the compartments (38) and/or the storage positions of the delivery containers (3) in storage spaces (39*a*, 39*b*, 39*c*) in the compartments (38) are determined, and
    the at least one transport rack (12) is loaded with the delivery containers (3) in step v) in the loading arrangement determined by the first computer system (2) in the compartments (38) in horizontal shelf rows disposed one above the other and/or adjacently disposed vertical shelf columns, and
    after step vii), the at least one transport rack (12) is transferred from the transport system (14) to a receiving system (15) in the buffer storage system (53) and the at least one transport rack (12) is identified by means of a detection unit (74) provided on the receiving system (15) by reading the data carrier (34) and recording data on a second computer system (75) in the buffer storage system (53), and
    data relating to the loading arrangement is provided on the second computer system (75) after the at least one transport rack (12) has been loaded with the delivery containers (3) in the supply storage system (1), and
    the at least one transport rack (12) is provided at the docking device (54) in the buffer storage system (53) in such a manner that the compartments (38) in horizontal shelf rows disposed one above the other and adjacently disposed vertical shelf columns lie within the access range of the storage and retrieval device (17) and the storage and retrieval device (17) is able to access the delivery containers (3) in these compartments (38), and
    while the transport rack (12) is provided at the docking device (54), the delivery containers (3) are transferred by the storage and retrieval device (17) from the compartments (38) either to the storage compartments (55) in the buffer storage system (53) if they have not yet been requested at the issuing station (56) or to the service location (58) if they have been requested at the issuing station (56),
    wherein the transport rack (12) has a maximum of five compartments (38) one above the other and a maximum of three compartments (38) adjacent to one another and the compartments (38) each have a maximum of three storage spaces (39*a*, 39*b*, 39*c*) so that a transport rack (12) can be loaded with a maximum of 45 delivery containers (3), wherein the delivery container (3) has a length (L) of at most 700 mm, a width (W) of at most 600 mm and a height (H) of at most 400 mm.

20. The method according to claim 19, wherein in a compartment (38), the transport rack (12) has a single storage space (39*a*) in which the delivery container (3) is deposited or in a compartment (38), the transport rack (12) has a plurality of storage spaces (39*a*, 39*b*, 39*c*) one behind the other in which a plurality of delivery containers (3) are deposited.

21. The method according to claim 19, wherein the delivery containers (3) are positioned in the compartment (38) against at least one position retaining means (41, 42) if the delivery containers (3) slide in the compartments (38) during transportation of the transport rack (12) or are held in a fixed position by at least one position retaining means (49) to prevent a sliding movement of the delivery containers (3) in the compartments (38).

22. The method according to claim 19, wherein after picking the items (4) in step ii), the delivery containers (3) are transported to a loading system (11) where the transport racks (12) are also provided and loaded with the delivery containers (3), and before loading the transport racks (12) the delivery containers (3) are also identified by means of a detection unit (25), and the delivery containers (3) are allocated to the respective transport rack (12) and to the respective compartments (38) in the transport rack (12) by the first computer system (2).

23. The method according to claim 19, wherein the supply storage system (1) comprises the first computer system (2) and the buffer storage system (53) comprises the second computer system (75) which are connected to one another in order to exchange data via a data transmission device (data line) and after loading the transport rack (12) in the supply storage system (1), data relating to the loading arrangement is transmitted to the second computer system (75).

24. The method according to claim 19, wherein the data carrier (34) on the transport rack (12) contains an identification code as data.

25. The method according to claim 24, wherein before providing the at least one transport rack (12) at the docking device (54) in the buffer storage system (53), the transport rack (12) is identified by means of the detection unit (74) and the identification code is transmitted to the computer system (75) of the buffer storage system (53), whereupon this transport rack (12) is provided at the docking device (54).

26. A system for delivering items (4) in delivery containers (3), comprising
transport racks (12), wherein each transport rack receives a number of the delivery containers (3) for a picking order and each transport rack having
compartments (38) in horizontal shelf rows disposed one above the other and in adjacently disposed vertical shelf columns, and
a data carrier (34),
wherein a transport rack (12) of the transport racks (12) has a maximum width of 2100 mm, a maximum depth of 1500 mm and a maximum height of 2000 mm,
a supply storage system (1), which comprises at least
a storage system (5) for providing the items (4),
a picking system (6) for picking the items (4) in accordance with picking orders in delivery containers (3) and for providing the delivery containers (3) containing the picked items (4),
a loading system (11) for providing the transport racks (12) and for transferring a number of the delivery containers (3) to a transport rack (12), the loading system (11) having a detection unit (25, 26) for identifying the at least one transport rack (12) by reading the data carrier (34) on the transport rack (12),
a first computer system (2) for recording data of the data carrier (34) and for determining a loading arrangement for loading the transport rack (12) with the delivery containers (3) in the loading arrangement in the compartments (38) in horizontal shelf rows disposed one above the other and/or in adjacently disposed vertical shelf columns, wherein the storage positions of the delivery containers (3) in the compartments (38) and/or storage positions of the delivery containers (3) in storage spaces (39a, 39b, 39c) in the compartments (38) are determined by the loading arrangement,
a transfer system (13) for transferring the transport rack (12) to a transport system (14), and
a transport system (14) for transporting the transport rack (12) from the supply storage system (1) to a buffer storage system (53), and
a buffer storage system (53), which comprises
a receiving system (15) for the transport racks (12) delivered by means of the transport system (14), wherein the receiving system (15) is provided with a detection unit (74) for identifying the transport rack (12) by reading the data carrier (34) on the transport rack (12),
a providing system (16) for providing transport racks (12) at at least one docking device (54),
storage compartments (55) for temporarily storing the delivery containers (3),
an automated storage and retrieval device (17) for removing the delivery containers (3) from the transport rack (12) and transferring at least some delivery containers (3) from the transport rack (12) to storage compartments (55),
at least one issuing station (56) having an input device (57) and at least one service location (58) at which the items (4) in the delivery containers (3) are made available if they have been requested by inputting a request command at the input device (57),
a second computer system (75) for recording data from the data carrier (34) and data relating to the loading arrangement which is provided after loading the at least one transport rack (12) in the supply storage system (1),
wherein the at least one docking device (54) for the transport rack (12) which positions the at least one transport rack (12) in such a manner that the compartments (38) formed by the horizontal shelf rows disposed one above the other and adjacently disposed vertical shelf columns lie within the access range of the automated storage and retrieval device (17) and the automated storage and retrieval device (17) is able to access the delivery containers (3) in these compartments (38), and
while the transport rack (12) is provided at the at least one docking device (54), the automated storage and retrieval device (17) transfers them from the compartments (38) either to the storage compartments (55) in the buffer storage system (53) if they have not yet been requested at the issuing station (56) or to at least one service location (58) if they have been requested at the issuing station (56).

27. The system according to claim 26, wherein the transport rack (12) comprises a base plate (40), wall parts (41, 42) extending up therefrom and a top plate (43), wherein one of the wall parts (42) can be moved between an open position and a closed position, wherein in the open position the delivery containers (3) of all the compartments (38) are accessible and in the closed position the delivery containers (3) of all the compartments (38) are secured in place.

28. The system according to claim 26, wherein the transport rack (12) has at most five compartments (38) one above the other and at most three compartments (38) adjacent to one another and the compartments (38) each have at most three storage spaces (39a, 39b, 39c).

29. The system according to claim 26, wherein the storage compartments (55) are provided in the stationary storage rack (67) in horizontal shelf rows disposed one above the other and in adjacently disposed vertical shelf columns, wherein the storage rack (67) forms a housing section (59)

in which the docking device (54) is provided so that when the transport rack (12) is positioned at the docking device (54), the transport rack (12) forms a storage section of the storage rack (67) by means of the compartments (38).

30. The system according to claim 26, wherein the transport rack (12) has at least one position retaining means (41, 42) against which the delivery containers (3) in the compartments (38) are positioned if the delivery containers (3) slide in the compartments (38) during transportation of the transport rack (12) or at least one position retaining means (49) by means of which the delivery containers (3) placed in the compartments (38) are held in a fixed position to prevent a sliding movement of the delivery containers (3) in the compartments (38).

31. The system according to claim 26, wherein the supply storage system (1) comprises the first computer system (2) and the buffer storage system (53) comprises the second computer system (75) which are connected to one another in order to exchange data via a data transmission device in order to transmit data relating to the loading arrangement to the second computer system (75) after loading the transport rack (12) in the supply storage system (1).

\* \* \* \* \*